US012756497B2

(12) United States Patent
Yamada et al.

(10) Patent No.: US 12,756,497 B2
(45) Date of Patent: Oct. 6, 2026

(54) COMMUNICATION APPARATUS, COMMUNICATION SYSTEM, AND COMMUNICATION METHOD

(71) Applicant: Sony Semiconductor Solutions Corporation, Kanagawa (JP)

(72) Inventors: Junya Yamada, Kanagawa (JP); Toshihisa Hyakudai, San Diego, CA (US); Satoshi Ota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 729 days.

(21) Appl. No.: 18/100,823

(22) Filed: Jan. 24, 2023

(65) Prior Publication Data

US 2023/0344552 A1 Oct. 26, 2023

(51) Int. Cl.
*H04L 5/14* (2006.01)
*H04L 1/00* (2006.01)

(52) U.S. Cl.
CPC .............. *H04L 1/0045* (2013.01); *H04L 5/14* (2013.01)

(58) Field of Classification Search
CPC ....... H04L 1/0045; H04L 5/14; H04L 1/0061; H04L 5/1469
USPC .......................................................... 370/294
See application file for complete search history.

(56) References Cited

U.S. PATENT DOCUMENTS 10,764,214 B1 * 9/2020 Plenderleith ........ H04L 43/0847
2009/0086759 A1 * 4/2009 Heise .................... H04L 1/1887 370/474
2016/0078966 A1 * 3/2016 Li ........................ G11C 16/349 714/723
2016/0165609 A1 * 6/2016 Konno .................... H04L 5/143 370/280
2020/0012555 A1 1/2020 Das Sharma
2021/0105198 A1 * 4/2021 Pandey ................ H04L 1/1671

FOREIGN PATENT DOCUMENTS

| | | | |
|---|---|---|---|
| EP | 4482060 | A1 | 12/2024 |
| JP | 2008118548 | A | 5/2008 |
| JP | 2011-239011 | A | 11/2011 |
| WO | WO-2021261223 | A1 | 12/2021 |

OTHER PUBLICATIONS

Dalmia KamaLalmia Kamal: "ASA Motionink Tutorial", Sep. 29, 2021(Sep. 29, 2021),pp. 232-244, XP093082534.
Sesia Stefania et al: "LTE—The UMTS Long Term Evolution: Section 10.3.2 Channel Coding for Data Channels", Aug. 29, 2011 (Aug. 29, 2011), pp. 232-244, XP093250603.

* cited by examiner

*Primary Examiner* — Chandrahas B Patel
*Assistant Examiner* — Meheret Woldegebreal Kidane
(74) *Attorney, Agent, or Firm* — Michael Best & Friedrich LLP

(57) ABSTRACT

To solve a problem related to error correction.
A communication apparatus includes: a PHY that receives a first transmission signal conforming to a predetermined communication protocol from a communication partner apparatus and performs error correction on a plurality of first packets included in the first transmission signal; and a LINK that separates the plurality of first packets after error correction and generates a second packet including error correction impossible information of the first packet on which the error correction has not been correctly performed, and the PHY transmits a second transmission signal including the second packet to the communication partner apparatus.

16 Claims, 24 Drawing Sheets

3: COMMUNICATION SYSTEM

Transmission Schedule

| | up#1 | down#1 | up#2 | down#2 | up#3 | down#3 |
|---|---|---|---|---|---|---|
| node1.Tx | SPI | | GPIO | | OAM | |
| node2.Tx | | SPI | | GPIO | | OAM |

Additional Extended OAM Header (OAM Error Part)

| Byte | Bit(s) | Name | Description |
|---|---|---|---|
| i | 1:0 | Mode Select | 00:normal header, 01:extended header, 1x:Reserved |
| y | 15:0 | OAM DEC Err | Count up when PDec#0 detects CRC error. saturate to 0xFF; reset to 0 |

OAM DEC Err Reg

| Byte | Bit(s) | Name | Description |
|---|---|---|---|
| i | 1:0 | Mode select | 00: normal header, 01: extend header, 1X:Reserved |
| y | 15:0 | OAM DEC Err | Counts up when PDec#0 detects a CRC Error. saturates to 0xFF; resets to 0. |

FIG. 24

| Byte | Bit(s) | Name | Description |
|---|---|---|---|
| i | 1:0 | Mode select | 00: normal header, 01: extend header, 1X:Reserved |
| m | 15:0 | FEC Err Time | 1st FEC Error time |
| m+2 | | | 2nd FEC Error time |
| m+4 | | | 3rd FEC Error time |
| n | 15:0 | FEC Err Count | Accumulate when FEC error occurs. |

FIG. 25

| Byte | Bit(s) | Name | Description |
|---|---|---|---|
| i | 1:0 | Mode select | 00: normal header, 01: extend header, 1X:Reserved |
| m | 15:0 | FEC Err Time | 1st FEC Error time |
| m+2 | | | 2nd FEC Error time |
| m+4 | | | 3rd FEC Error time |
| n | 15:0 | FEC Err Count | Accumulate when FEC error occurs. |
| o | 15:0 | FEC Err Appli ID | 1st FEC Error Application ID |
| o+2 | | | 2nd FEC Error Application ID |
| o+4 | | | 3rd FEC Error Application ID |
| p | 15:0 | FEC Err Appli Status | FEC Err Appli Status[15:0] |
| p+2 | | | FEC Err Appli Status[31:16] |
| p+4 | | | FEC Err Appli Status[47:32] |
| p+6 | | | FEC Err Appli Status[63:48] |

Transmission Schedule

| | up#1 | down#1 | up#2 | down#2 | up#3 | down#3 |
|---|---|---|---|---|---|---|
| node1.Tx | SPI | | GPIO | | OAM | |
| node2.Tx | | SPI | | ~~GPIO~~ (OAM) | | OAM |

FIG. 28

| Byte | Bit(s) | Name | Description |
|---|---|---|---|
| i | 1:0 | Mode select | 00: normal header, 01: extend header, 1X:Reserved |
| m | 15:0 | FEC Err Time | 1st FEC Error time |
| m+2 | | | 2nd FEC Error time |
| m+4 | | | 3rd FEC Error time |
| n | 15:0 | FEC Err Count | Accumulate when FEC error occurs. |
| o | 15:0 | FEC Err Appli ID | 1st FEC Error Application ID |
| o+2 | | | 2nd FEC Error Application ID |
| o+4 | | | 3rd FEC Error Application ID |
| p | 15:0 | FEC Err Appli Status | FEC Err Appli Status[15:0] |
| p+2 | | | FEC Err Appli Status[31:16] |
| p+4 | | | FEC Err Appli Status[47:32] |
| p+6 | | | FEC Err Appli Status[63:48] |
| y | 15:0 | OAM DEC Err | Counts up when PDec#0 detects a CRC Error. saturates to 0xFFFF; resets to 0. |

Error INFORMATION USED IN SECOND AND THIRD EMBODIMENTS (rows i through p+6)

Error INFORMATION USED IN FIRST EMBODIMENT (row y)

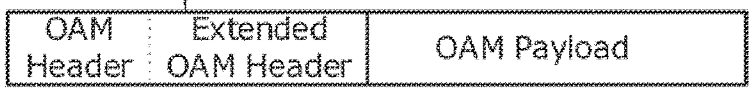

Mode select (2'b01)

COMMUNICATION APPARATUS, COMMUNICATION SYSTEM, AND COMMUNICATION METHOD

CROSS REFERENCE TO RELATED APPLICATIONS

This application claims the benefit of U.S. Priority Patent Application No. 63/296,967 filed on Jan. 6, 2022, the entire contents of which are incorporated herein by reference.

TECHNICAL FIELD

The present disclosure relates to a communication apparatus, a communication system, and a communication method.

BACKGROUND ART

A technique for performing high-speed serial communication between a plurality of devices has been proposed (Patent Literature 1). This type of high-speed serial communication is used in various fields, and is also used for communication between in-vehicle devices, for example.

CITATION LIST

Patent Literature

[PTL1]
JP 2011-239011 A

SUMMARY

Technical Problem

With the progress of automated driving technology and electronic technology, there is an increasing need for high-speed communication between in-vehicle devices. Automotive SerDes Alliance (ASA) assumes that time division duplexing (TDD) communication is performed between a Root device and a Leaf device connected to a cable.

In the ASA standard Spec V 1.01, there is a problem that if error correction is difficult to be correctly performed on a packet sent from the Root device to the Leaf device in the Leaf device, the Root device is difficult to know the fact.

Therefore, the present disclosure provides a communication apparatus, a communication system, and a communication method that can solve a problem related to error correction.

Solution to Problem

According to the present disclosure, there is provided communication apparatus including: a PHY that receives a first transmission signal conforming to a predetermined communication protocol from a communication partner apparatus and performs error correction on a plurality of first packets included in the first transmission signal; and a LINK that separates the plurality of first packets after error correction and generates a second packet including error correction impossible information of the first packet on which the error correction has not been correctly performed, in which the PHY transmits a second transmission signal including the second packet to the communication partner apparatus.

The plurality of first packets may include at least one of an application packet or a first operation, administration, and maintenance (OAM) packet, and the second packet may include a second OAM packet.

The LINK may include a register that stores the error correction impossible information, and the first OAM packet may include address information of the register in which the error correction impossible information is stored.

The second OAM packet may include a header and a payload, and the payload of the second OAM packet may include the error correction impossible information.

The error correction impossible information may include reception time information of an application packet in which error correction may be impossible first in a transmission unit of the transmission signal and total number information of application packets in which error correction may be impossible in the transmission unit, and the address information in the first OAM packet may include first address information specifying the reception time information in the register and second address information specifying the total number information in the register.

The error correction impossible information may include reception time information of n (n is an integer of 1 or more) application packets in which error correction may be impossible from the beginning in a transmission unit of the transmission signal and total number information of application packets in which error correction may be impossible in the transmission unit, and the address information in the first OAM packet may include the n pieces of first address information specifying the n pieces of reception time information in the register and second address information specifying the total number information in the register.

The error correction impossible information may include reception time information of an application packet in which error correction may be impossible first in a transmission unit of the transmission signal, total number information of application packets in which error correction may be impossible in the transmission unit, identification information of an application packet in which error correction may be impossible first in a transmission unit of the transmission signal, and bit string information in which whether or not error correction may be impossible is allocated to each application packet transmitted in the transmission unit in units of bits, and the address information in the first OAM packet may include first address information specifying the reception time information in the register, second address information specifying the total number information in the register, third address information specifying the identification information in the register, and fourth address information specifying the bit string information in the register.

The LINK may include an OAM unit that decodes the first OAM packet and generates the second OAM packet, the first OAM packet may include an error detection code, and the PHY may detect an error in the first OAM packet on the basis of the error detection code and output an error detection signal.

The number-of-times storage unit that stores a number of times of detection of an error of the first OAM packet by the OAM unit for each transmission unit of the transmission signal may be provided, and the second OAM packet may include information of the number of times stored in the number-of-times storage unit.

The second OAM packet may include the error correction impossible information read from the number-of-times storage unit on the basis of the address information. The second OAM packet may include the error correction impossible information.

The second OAM packet may include a header and a payload, the payload of the second OAM packet may include the error correction impossible information, and the payload of the second OAM packet may have a byte length corresponding to an amount of the error correction impossible information.

The second OAM packet may include a header and a payload, and the length of the header of the second OAM packet may be different between a case where the error correction impossible information is included and a case where the error correction impossible information is not included. The second OAM packet may be transmitted to the communication partner apparatus as a response to the first OAM packet from the communication partner apparatus.

The second OAM packet may be transmitted to the communication partner apparatus each time it is determined that error correction of the first packet may be impossible in the PHY.

The plurality of first packets may include at least one of an I2C packet, an SPI packet, or a GPIO packet.

Information may be alternately transmitted and received to and from the communication partner apparatus within a period allocated by a time division duplex (TDD) communication system.

According to the present disclosure, there is provided a communication apparatus including:

a LINK that generates a transmission packet including a plurality of first packets; and a PHY that generates a first transmission signal conforming to a predetermined communication protocol on the basis of the transmission packet, transmits the first transmission signal to a communication partner apparatus, and receives a second transmission signal from the communication partner apparatus, in which the LINK restores a second packet on the basis of the second transmission signal, the plurality of first packets includes at least one of an application packet or a first operation, administration, and maintenance (OAM) packet, and the second packet includes error correction impossible information of the first packet in which the communication partner apparatus has failed to correctly perform error correction.

According to the present disclosure, there is provided a communication system including:

a first communication apparatus; and a second communication apparatus that alternately transmits and receives information to and from the first communication apparatus within a period allocated by a time division duplex (TDD) communication system, in which the first communication apparatus includes:

a first LINK that generates a first transmission packet including a plurality of first packets; and a first PHY that generates a first transmission signal conforming to a predetermined communication protocol on the basis of the first transmission packet, transmits the first transmission signal to the second communication apparatus, and receives a second transmission signal from the second communication apparatus, the second communication apparatus includes:

a second PHY that receives the first transmission signal conforming to the communication protocol from the first communication apparatus and performs error correction on a plurality of first packets included in the first transmission signal; and a second LINK that separates the plurality of first packets after error correction and generates a second packet including error correction impossible information of the first packet on which error correction has not been correctly performed, and the second PHY transmits the second transmission signal including the second packet to the first communication apparatus.

A communication method including:

receiving a first transmission signal conforming to a predetermined communication protocol from a communication partner apparatus, and performing error correction on a plurality of first packets included in the first transmission signal;

separating the plurality of first packets after error correction and generating a second packet including error correction impossible information of the first packet in which the error correction has not been correctly performed; and transmitting a second transmission signal including the second packet to the communication partner apparatus.

BRIEF DESCRIPTION OF DRAWINGS

FIG. 24 is a diagram illustrating a second configuration example of an extended OAM Header.

FIG. 25 is a diagram illustrating an example in which an FEC Error Application ID and an FEC Error Application Status are included in the extended OAM Header in FIG. 24.

FIG. 28 is a diagram illustrating a configuration of an extended OAM Header of an OAM return.

DESCRIPTION OF EMBODIMENTS

Hereinafter, embodiments of a communication apparatus, a communication system, and a communication method will be described with reference to the drawings. Although main components of the communication apparatus and the communication system will be mainly described below, the communication apparatus and the communication system may have components and functions that are not illustrated or described. The following description does not exclude components and functions that are not illustrated or described.

First, a basic configuration and operation of a communication apparatus and a communication system according to the present disclosure will be described.

Figure 1:
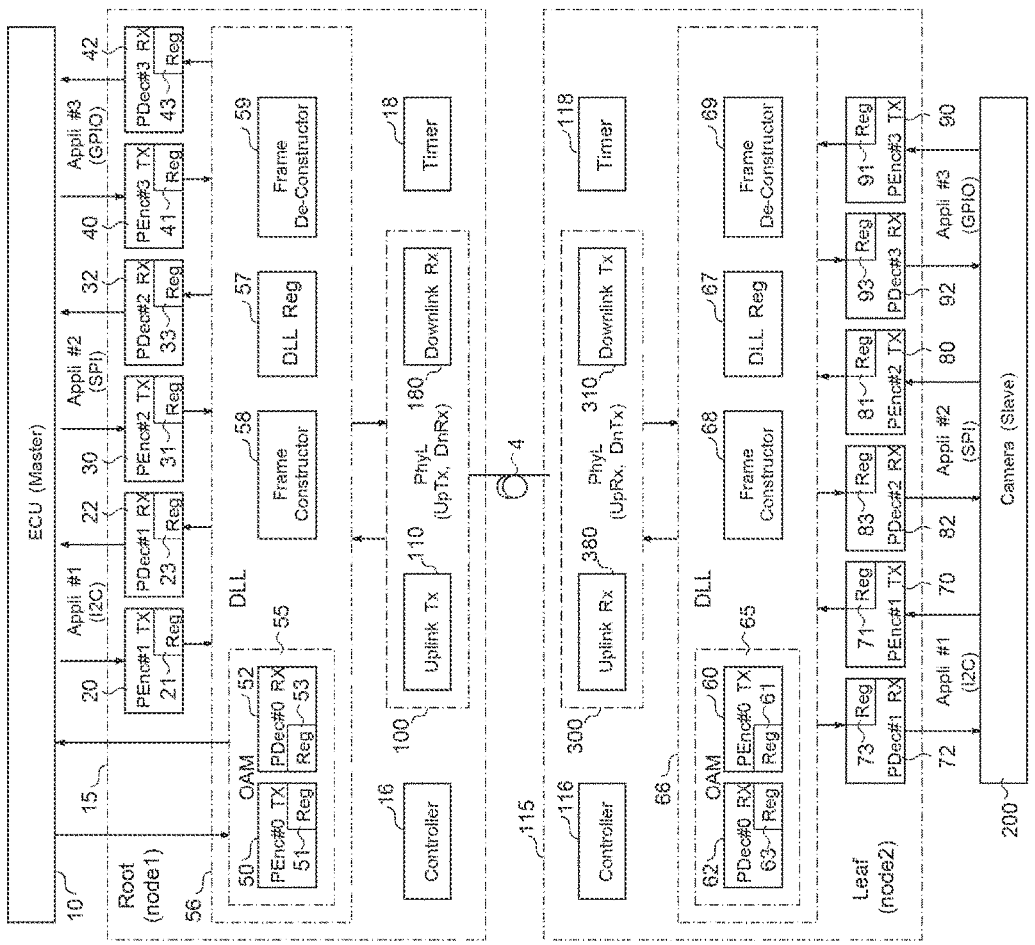
FIG. 1 is a block diagram illustrating a basic configuration of a communication system according to the present disclosure.
Figure 2:
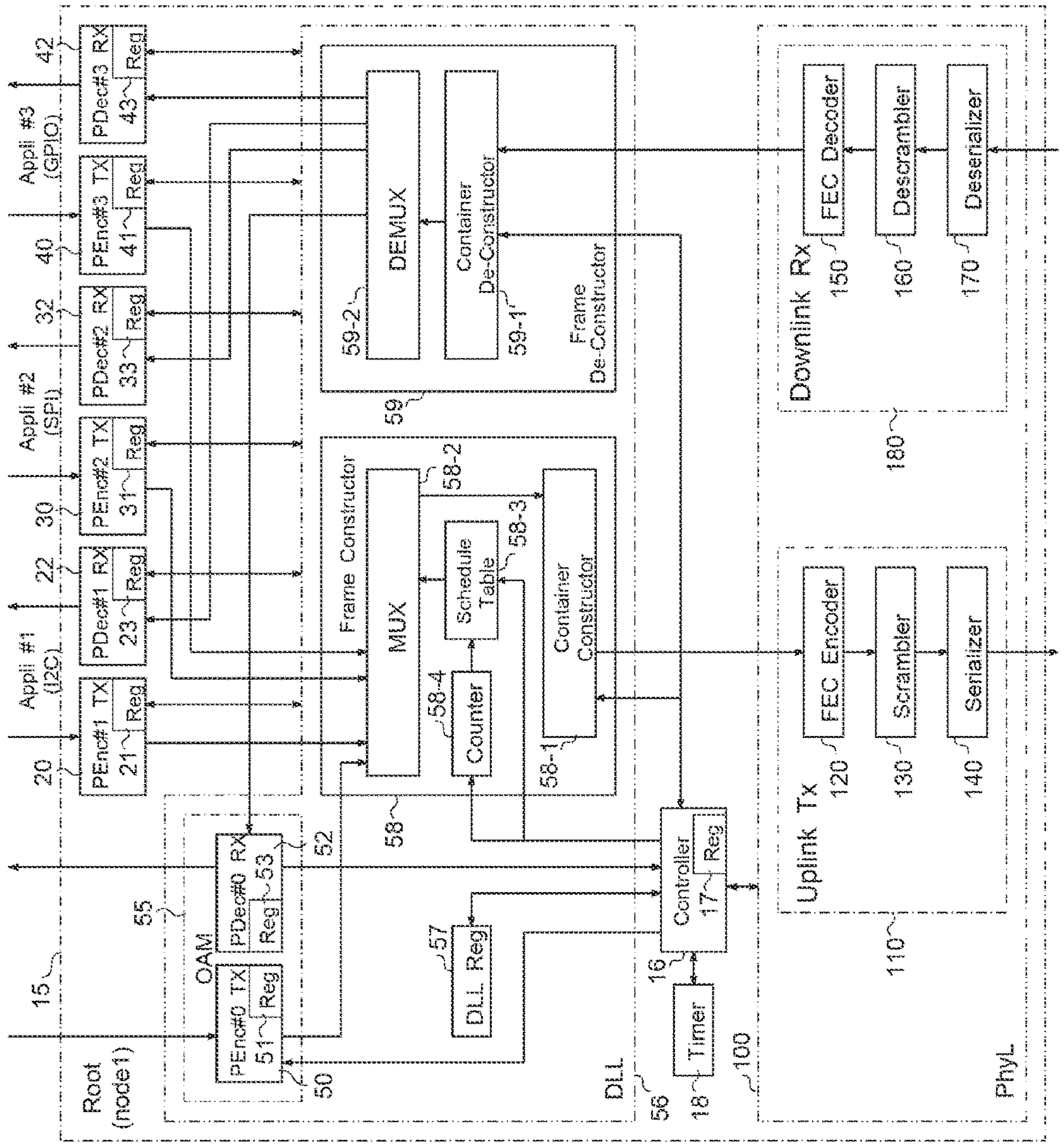
FIG. 2 is a block diagram illustrating an internal configuration of a Root device.
Figure 3:
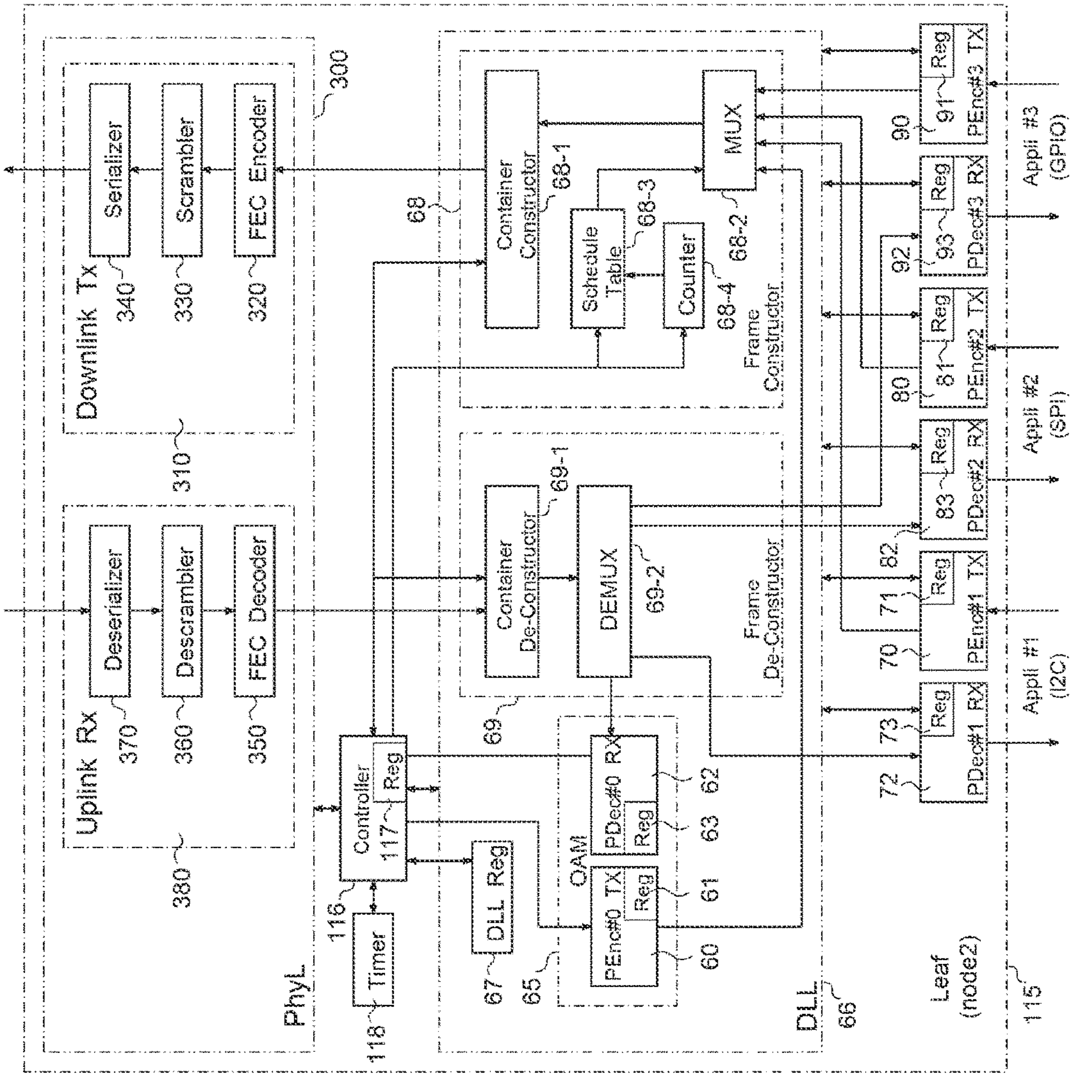
FIG. 3 is a block diagram illustrating an internal configuration of a Leaf device.

FIG. 1 is a block diagram illustrating a basic configuration of a communication system (3) according to the present disclosure. The communication system (3) in FIG. 1 includes a Root device (15) and a Leaf device (115). FIG. 2 is a block diagram illustrating an internal configuration of the Root device (15), and FIG. 3 is a block diagram illustrating an internal configuration of the Leaf device (115). The Root device (15) and the Leaf device (115) are connected by a cable (4) and can perform high-speed serial communication. The Root device (15) and the Leaf device (115) perform TDD communication in compliance with the ASA. In this specification, a path for transmitting information transmitted from the Root device (15) to the Leaf device (115) is referred to as an Up link, and a path for transmitting information transmitted from the Leaf device (115) to the Root device (15) is referred to as a Down link. The Up link and the Down link are virtually provided in the same cable (4). The following describes an example in which the Root device (15) is located in a node1 and the Leaf device (115) is located in a node2. The root device (15) includes an ECU (10), a packet encoder PEnc #1 (20) and a packet decoder PDec #1 (22) for Internet Integrated Circuit (I2C), a packet encoder PEnc #2 (30) and a packet decoder PDec #2 (32) for SPI, a packet encoder PEnc #3 (40) and a packet decoder PDec #3 (42) for GPIO, a DLL (56), a PhyL (100), a Controller (16), and a Timer (18).

The ECU (10) is an example of a Master device. The ECU (10) controls the entire system and simultaneously receives and processes an application signal such as a video signal transmitted from the Leaf device (115). The ECU (10) generates a control signal for controlling each unit.

The PEnc #1 (20), PEnc #2 (30), and PEnc #3 (40) perform encoding processing of encapsulating a control signal from the ECU (10). The PDec #1 (22), PDec #2 (32), and PDec #3 (42) perform decoding processing of decoding the encapsulated Application packet from the Leaf device (115) into an original application signal.

The DLL (56) generates an Up link packet including one or more Application packets encapsulated in the PEnc #1 (20), PEnc #2 (30), and PEnc #3 (40), extracts one or more application packets included in a Down link packet transmitted from the Leaf device (115), and sends the one or more Application packets to the corresponding packet decoder PDec.

The PHYL (100) outputs a transmission signal including the Up link packet generated by the DLL (56) to the cable (4) in accordance with timing of TDD, receives a signal including a Down link packet sent from the Leaf device (115) to the cable (4), and sends the received Down link packet to the DLL (56).

The Controller (16) controls each unit in the Root device (15). The Timer (18) is used to synchronize with the Leaf device (115).

An example in which the Root device (15) of FIG. 1 transmits an Application packet including an I2C packet, an SPI packet, and a GPIO packet to the Leaf device (115) will be described, but the Application packet may include a packet other than the above-described packets.

The DLL (56) includes a Frame Constructor (58), a Frame De-Constructor (59), a DLL Register (57), and an OAM unit (55).

The Frame Constructor (58) integrates a plurality of Application packets and OAM packets to generate an Uplink packet. The Frame De-Constructor (59) decomposes a Downlink packet from the Leaf device (115) into a plurality of Application packets. The DLL Register (57) records error correction impossible information and the like as described later.

The OAM unit (55) includes a PEnc #0 (50) that encodes an OAM packet provided separately from the Application packet, and a PDec #0 (52) that decodes the OAM packet.

The PhyL (100) includes an Uplink Tx (110) that transmits an Uplink packet and a Downlink Rx (180) that receives a Downlink packet.

The Leaf device (115) includes a Camera (200), a PEnc #1 (70) and a PDec #1 (72) for an Internet Integrated Circuit (I2C), a PEnc #2 (80) and a PDec #2 (82) for SPI, a PEnc #3 (90) and a PDec #3 (92) for GPIO, a DLL (66), a PhyL (300), a Controller (116), and a Timer (118).

The Camera (200) is an example of a Slave device. The Camera (200) receives and processes a control signal transmitted from the Root device (15) together with output of image data. The Camera (200) transmits and receives I2C packets, SPI packets, and GPIO packets to and from the Leaf device (115).

The PEnc #1 (70), PEnc #2 (80), and PEnc #3 (90) perform encoding processing of encapsulating a control signal from the Camera (200). The PDec #1 (72), PDec #2 (82), and PDec #3 (92) perform decoding processing of decoding the encapsulated Application packet from the Root device (15) into an original Application signal.

The DLL (66) generates a Downlink packet including one or more Application packets encapsulated in the PEnc #1 (70), PEnc #2 (80), and PEnc #3 (90), extracts one or more Application packets included in the Uplink packet transmitted from the Root device (15), and sends the one or more Application packets to the PDec #1 (72), PDec #2 (82), and PDec #3 (92).

The PHYL (300) outputs a signal including a Downlink packet generated by the DLL (66) to the cable (4) in accordance with the timing of TDD, receives a signal including an Uplink packet sent from the Root device (15) to the cable (4), and sends the received Uplink packet to the DLL (66).

The Controller (116) controls each unit in the Leaf device (115). The timer (118) is used to synchronize with the Root device (15).

The DLL (66) includes a Frame Constructor (68), a Frame De-Constructor (69), a DLL Register (67), and an OAM unit (65).

The Frame Constructor (68) integrates a plurality of Application packets and OAM packets to generate a Downlink packet. The Frame De-Constructor (69) decomposes the Uplink packet from the Root device (15) into a plurality of Application packets. The DLL Register (67) records error correction impossible information as described later.

The OAM unit (65) includes a PEnc #0 (60) that encodes an OAM packet provided separately from the Application packet, and a PDec #0 (62) that decodes the OAM packet. The PhyL (300) includes a Downlink Tx (310) that transmits a Downlink packet and an Uplink Rx (380) that receives an Uplink packet.

Figure 4A:
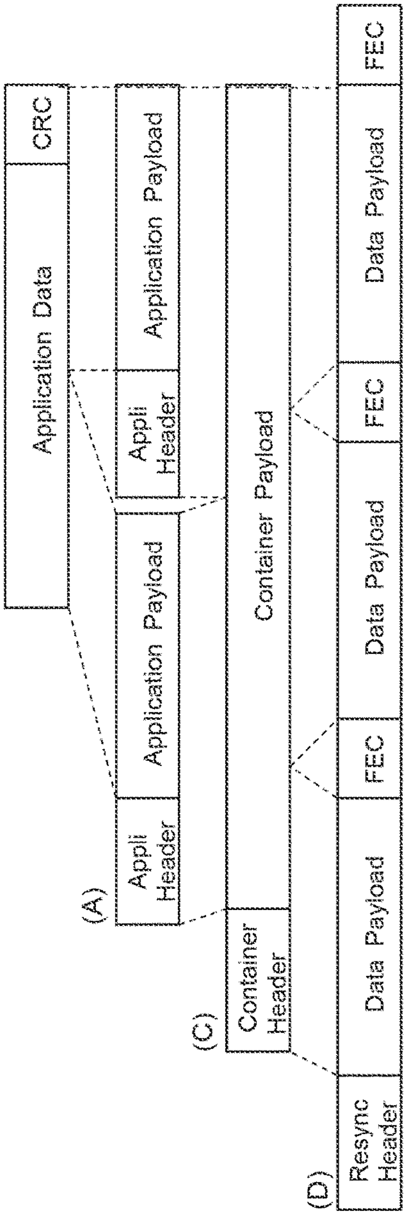
FIG. 4A is a diagram illustrating a hierarchical structure of Application packets transmitted and received between a Root device and a Leaf device.

FIG. 4A is a diagram illustrating a hierarchical structure of Application packets transmitted and received between the Root device (15) and the Leaf device (115). An Application signal input to and output from the ECU (10) or the camera (200) includes Application data and a cyclic redundancy check (CRC) which is an error detection code.

As illustrated in FIG. 4A (A), the Application packet input to and output from the packet encoder PEnc or the packet decoder PDec includes an Application Header and an Application Payload.

An Uplink packet or a Downlink packet input to and output from the DLL (56) (66) is also referred to as a Container, and includes a Container Header and a Container Payload as illustrated in FIG. 4A (C). The Container Payload includes one or more Application packets.

A transmission signal input to and output from the PhyL (100) (300) includes a Resync Header and a plurality of Data Payloads as illustrated in FIG. 4A (D). A Forward Error Correction (FEC) code is added to the end of each Data Payload.

Figure 4B:
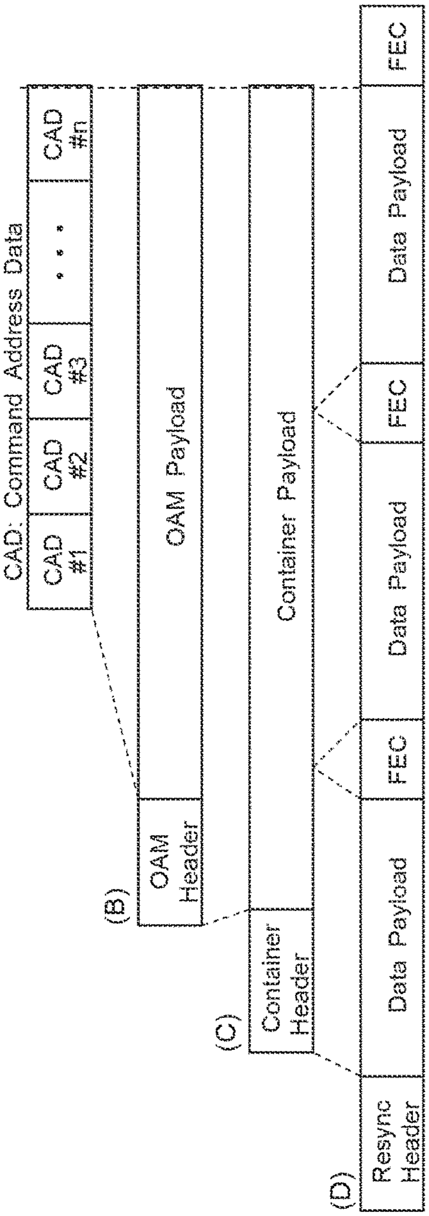
FIG. 4B is a diagram illustrating a hierarchical structure of OAM packets transmitted and received between a Root device and a Leaf device.

FIG. 4B is a diagram illustrating a hierarchical structure of an OAM packet transmitted and received between the Root device (15) and the Leaf device (115). The OAM packet is generated by the OAM units (55) and (65) of the DLL (56) and (66). The OAM units (55) and (65) include one or more CAD (Command, Address, Data) including a command, an address, and data. In the basic configuration of the OAM packet, an error detection code such as CRC is not added to CAD.

As illustrated in FIG. 4B (B), the OAM packet includes an OAM Header and an OAM Payload.

An Uplink packet or a Downlink packet input to and output from the DLL (56) (60) includes a Container Header and a Container Payload as illustrated in FIG. 4B (C), and the Container Payload includes an OAM packet.

A transmission signal input to and output from the PhyL (100) (300) includes a Resync Header and a plurality of Data Payloads as illustrated in FIG. 4B (D), and the Data Payload includes an OAM packet.

Figure 5:
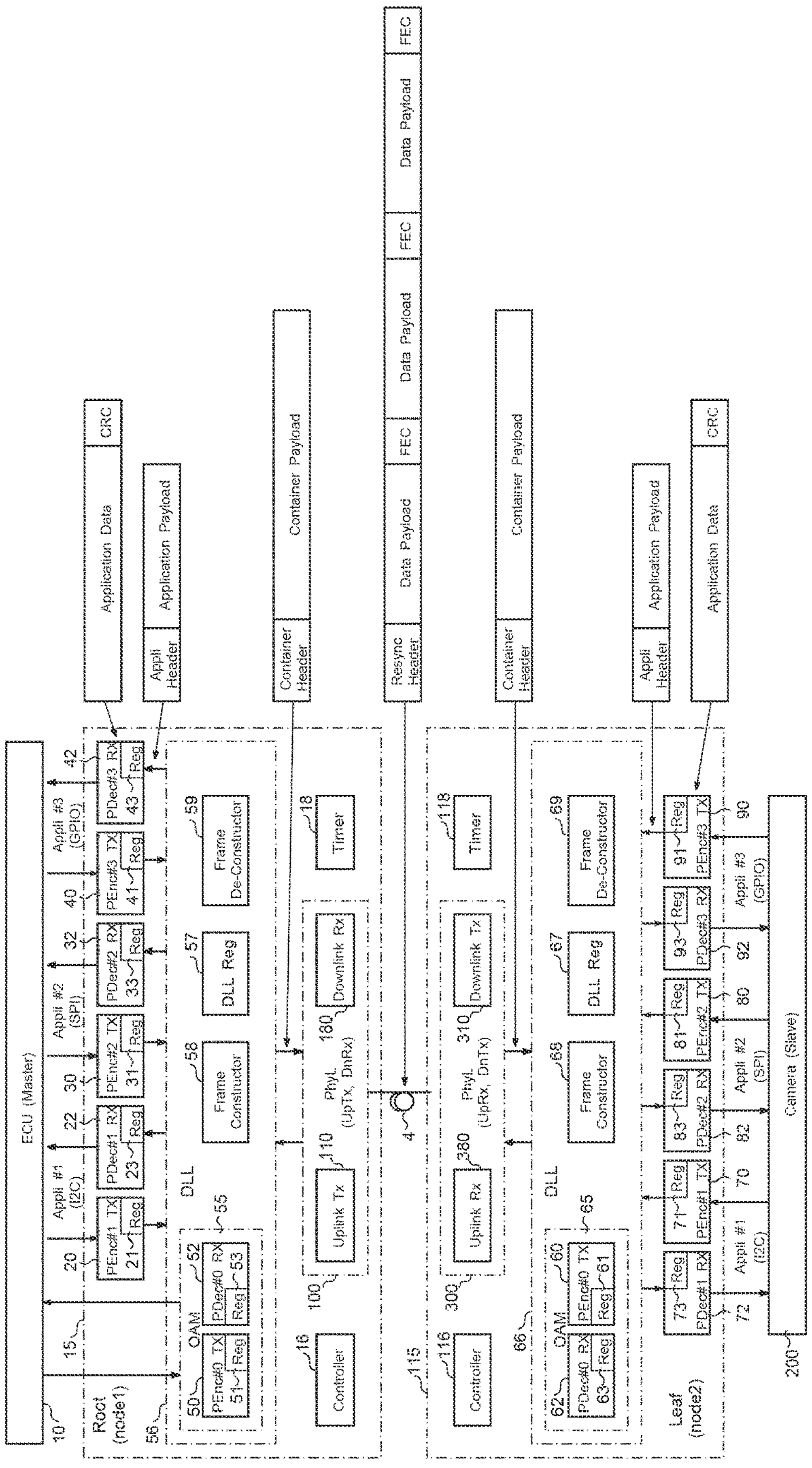
FIG. 5 is a diagram illustrating a processing operation when an Application packet is transmitted and received in the communication system of FIG. 1.

FIG. 5 is a diagram illustrating a processing operation when an Application packet is transmitted and received in the communication system (3) of FIG. 1. The Root device (15) and the Leaf device (115) have a packet encoder PEnc and a packet decoder PDec for each Application. The packet encoder PEnc generates an Application packet on the basis of Application data from a corresponding Application. The packet decoder PDec restores the Application data from the Application packets output from the DLL (56) (66).

FIG. 5 illustrates an example using I2C, SPI, and GPIO as Applications. In the example of FIG. 5, the PEnc #1 (20, 70) and the PDec #1 (22, 72) are used for packet conversion of I2C. For packet conversion of SPI, the PEnc #2 (30, 80) and the PDec #2 (32, 82) are used. For packet conversion of GPIO, the PEnc #3 (40, 90) and the PDec #3 (42, 92) are used.

Each packet encoder PEnc generates an Application packet (FIG. 4A (A)) for each Application and transmits the Application packet to the DLL (56) (66). Each PDec restores the original Application data from the Application packets (FIG. 4A (A)) output from the DLL (56) (66). When restoring the original Application data from the Application packet (FIG. 4A (A)), each packet decoder PDec can detect whether or not there is an error in the received Application packet on the basis of the CRC included in the Application Payload.

The DLL (56) (66) generates a Container (FIG. 4A (C)) in which the Application packets (FIG. 4A (A)) received from the respective PEnc are integrated, and transmits the Container to the PhyL (100) (300). Further, the DLL (56) (66) extracts the Application packet (FIG. 4A (A)) for each Application from the Container (FIG. 4A (C)) received by the PhyL (100) (300), and transmits the Application packet to the corresponding PDec.

The PhyL (100) (300) converts the Container (FIG. 4A (C)) output from the DLL (56) (66) into a PHY format (FIG. 4A (D)) of the ASA, and transmits the PHY format to the Leaf device (115) or the Root device (15) as a communication partner apparatus.

Figure 6:
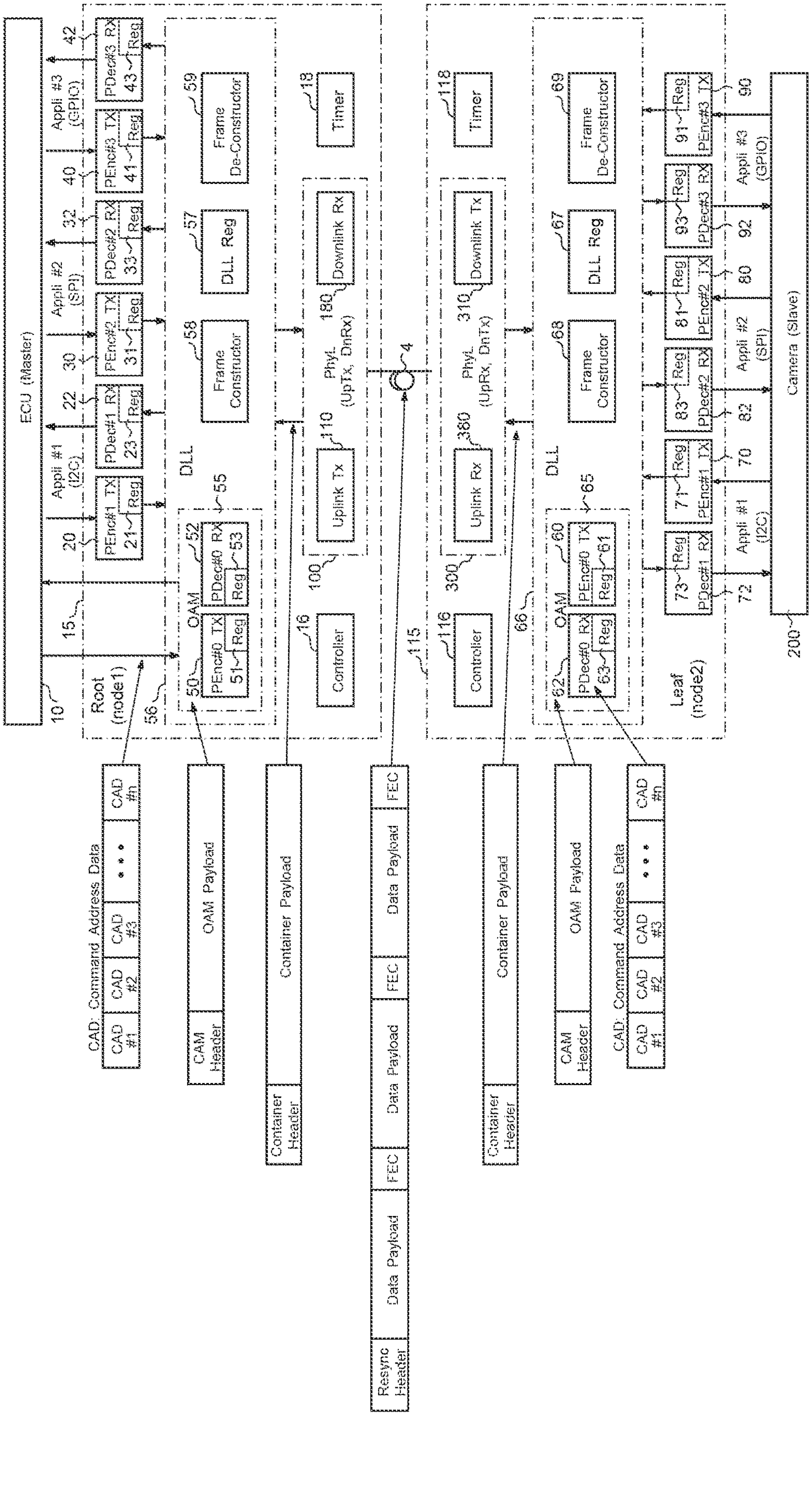
FIG. 6 is a diagram illustrating a processing operation when an OAM packet is transmitted and received in the communication system of FIG. 1.

FIG. 6 is a diagram illustrating a processing operation when an OAM packet is transmitted and received in the communication system (3) of FIG. 1. The ECU (10) may transmit and receive OAM packets between the Root device (15) and the Leaf device (115). In the example of FIG. 6, the PEnc #0 (50) (60) is used to generate the OAM packet, and the PDec #0 (52) (62) is used to decode the OAM packet into the original CAD (Command, Address, Data).

The PEnc #0 (50) (60) generates an OAM packet (FIG. 4B (B)) and transmits the OAM packet to the DLL (56) (66). The PDec #0 (52) (62) restores the original CAD from the OAM packet (FIG. 4B (B)) output from the DLL (56) (66). When the PDec #0 (52) (62) restores the original CAD from the OAM packet (FIG. 4B (B)), since the payload of the OAM packet does not include the error detection code such as CRC, error detection of the received OAM packet is difficult to be performed.

The DLL (56) (66) incorporates the OAM packets (FIG. 4B (B)) output from the PEnc #0 (50) (60) into a container (FIG. 4B (C)), and transmits the OAM packets to the PhyL (100) (300). Further, the OAM packet (FIG. 4B (B)) is extracted from the container (FIG. 4B (C)) output from the PhyL (100) (300), and the OAM packet (FIG. 4B (B)) is transmitted to the corresponding PDec #0 (52) (62).

The PhyL (100) (300) converts the container (FIG. 4B (C)) output from the DLL (56) (66) into a PHY format (FIG. 4B (D)) of the ASA, and transmits the PHY format to the Leaf device (115) or the Root device (15) as a communication partner apparatus.

Figures 7, 8:
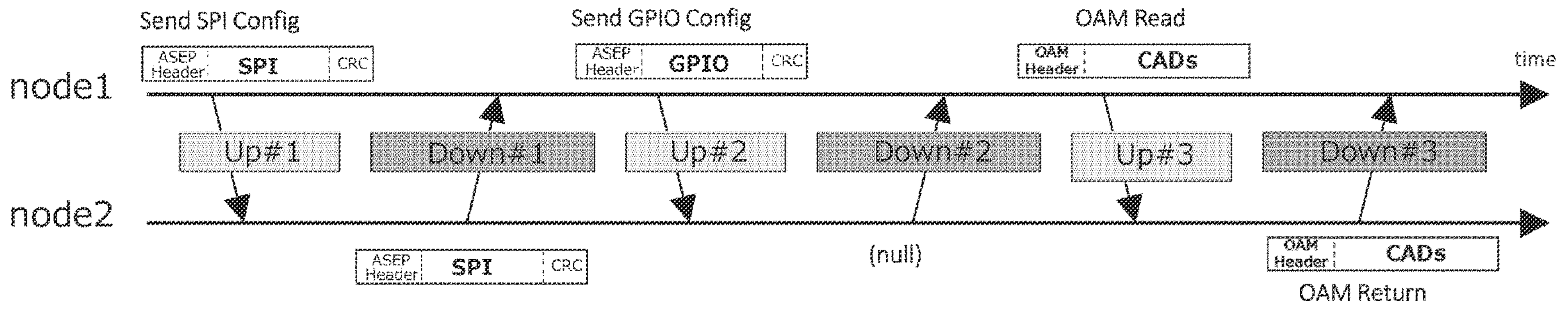
FIG. 7 is a diagram illustrating a Transmission Schedule between a Root device located in a node1 and a Leaf device located in a node2.
FIG. 8 is a diagram illustrating transmission timings of a plurality of packets to be transmitted and received by a Root device located in the node1 and a Leaf device located in the node2 according to the Transmission Schedule in FIG. 7.

FIG. 7 is a diagram illustrating a Transmission Schedule between the Root device (15) located at the node1 and the Leaf device (115) located at the node2. FIG. 8 is a diagram illustrating transmission timings of a plurality of packets to be transmitted and received by the Root device (15) located at the node1 and the Leaf device (115) located at the node2 according to the Transmission Schedule in FIG. 7.

The ECU (10) transmits SPI or GPIO Config information to the node2 via the node1. In an Uplink #1 of FIG. 8, the node1 transmits an Application packet (FIG. 4A (A)) including SPI Config information to the node2. FIG. 8 illustrates an example in which the node2 normally receives an Application packet including SPI Config information.

The node2 writes SPI Config information from the received Application packet (FIG. 4A (A)) to the PEnc #2 (80) and PDec #2 (82) that perform SPI protocol conversion.

In a Downlink #1, the node2 transmits an Application packet (FIG. 4A (A)) including SPI data of the response to the node1.

In an Uplink #2, the node1 transmits an Application packet (FIG. 4A (A)) including GPIO Config information to the node2. FIG. 8 illustrates an example in which the node2 normally receives an Application packet including GPIO Config information.

The node2 writes GPIO Config information from the received Application packet (FIG. 4A (A)) to the PEnc #2 (90) and PDec #2 (92) that perform GPIO protocol conversion.

In a Downlink #2, since there is no data of the GPIO signal to be transmitted, the PEnc #2 (90) of the node2 transmits null data to the node1.

The ECU (10) confirms that the node2 can normally receive SPI and GPIO Config information via the node1.

In an Uplink #3, the node1 transmits the Read Address of the register for checking whether or not an FEC Error has occurred in the node2 at the time of Config write to the node2 as an OAM Read command of the OAM packet (FIG. 4B (A)).

In a Downlink #3, the node2 includes the register value of the Read Address specified in CAD of the OAM Read from the received OAM packet (FIG. 4B (A)) in the OAM packet (FIG. 4B (A)) as an OAM Return and transmits the OAM packet (FIG. 4B (A)) to the node1.

The ECU (10) checks the result of the OAM return received by the node1 and checks the Error status at the time of Config write of the node2. If no Error information is included, the node2 determines that Config information has been normally received, and the ECU (10) can proceed to the next process.

The Control Register (17) in the Controller (16) includes schedule data that specifies the data transmission order of the Root (node1). The DLL Register (57) includes information necessary for generating an OAM Header of the OAM packet (FIG. 4B (A)).

The Controller (16) reads information necessary for generating the OAM Header from the DLL Register (57) and transmits the information to the PEnc #0 (50).

In the example of node1.tx in FIG. 7, the Controller (16) writes schedule data circulating in the order of 1. SPI, 2. GPIO, and 3. OAM included in the Control Register (17) and the write data length of the schedule data to a Schedule Table (58-3).

The Controller (16) sends a count start signal to a Counter (58-4) that controls the transmission packet order indicated in the Schedule Table, and the Schedule Table (58-3) sends a selection signal circulating in the order of 1. SPI, 2. GPIO, and 3. OAM according to a value from the Counter (58-4) to a Mux (58-2).

The Mux (58-2) transmits the Application packet (FIG. 4A (A)) or the OAM packet (FIG. 4B (A)) received from the corresponding PEnc to a Container Constructor (58-1) according to the selection signal from the Schedule Table (58-3).

The Container Constructor (58-1) packs the packets received from the Mux (58-2) into a Container (FIG. 4A (C)) and sends it to the node2 via the PhyL (100).

The Controller (116) in the Leaf device (115) performs configuration of a Container De-Constructor (69-1). The Container De-Constructor (69-1) extracts the Application packet (FIG. 4A (A)) or the OAM packet (FIG. 4B (A)) included in the Container Payload of the Container (FIG. 4A (C)) received from the PhyL (300) and sends the Application packet or the OAM packet to a DeMux (69-2). The DeMux (69-2) transmits the received Application packet (FIG. 4A (A)) or OAM packet (FIG. 4B (A)) to the corresponding PDec. As a result, for example, the DeMux (69-2) of a node2.Rx having received the transmission data of a node1.Tx in FIG. 7 transmits the Application packet of Application #2 (SPI) to the PDec #2 (82) in the Uplink #1, transmits the Application packet of Application #3 (GPIO) (FIG. 4A (A)) to the PDec #3 (92) in the Uplink #2, and transmits the OAM packet (FIG. 4B (A)) to the PDec #0 (62) in the Uplink #3.

Figure 9:
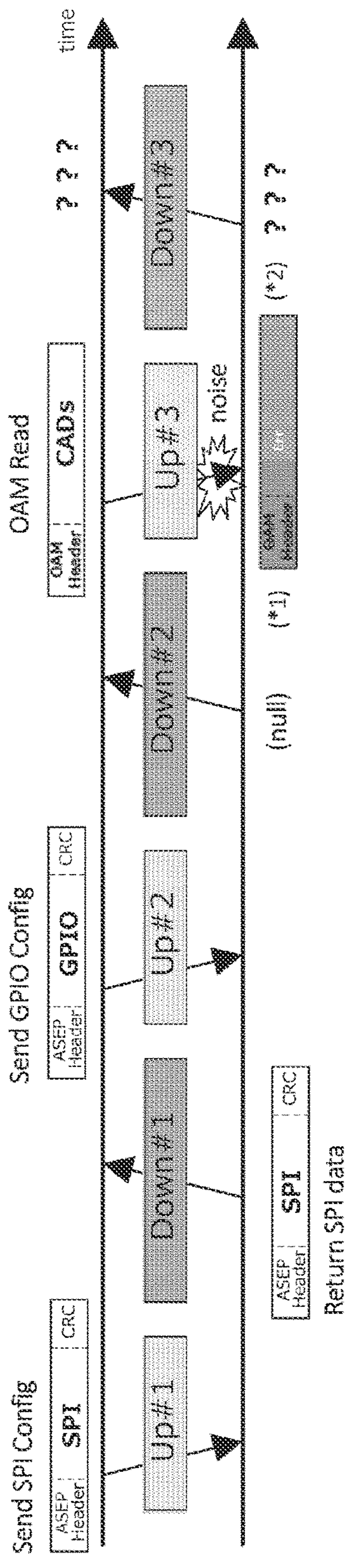
FIG. 9 is a diagram illustrating a problem when an OAM packet of an uplink #3 in FIG. 8 is transmitted from the node1 to the node2.
Figure 10:
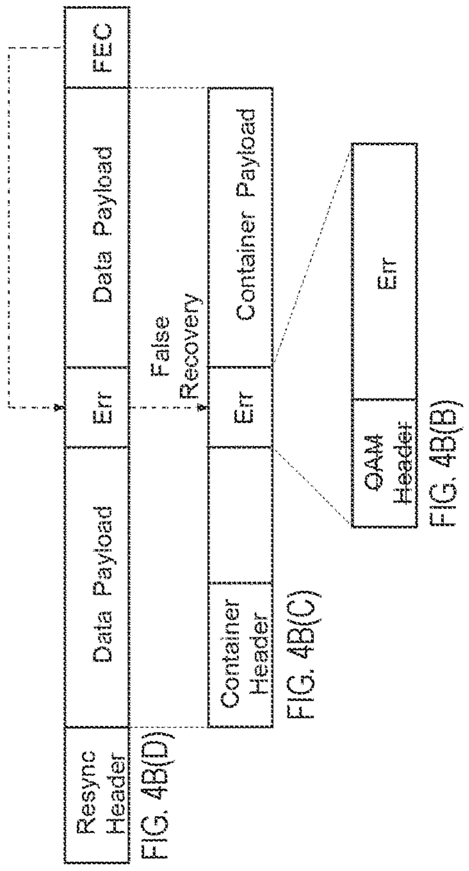
FIG. 10 is a diagram illustrating an example in which an error that is difficult to be corrected is included in a payload of a transmission signal received by a PhyL of the node2.

FIG. 9 is a diagram illustrating a problem when an OAM packet of the Uplink #3 in FIG. 8 is transmitted from the node1 to the node2. FIG. 10 is a diagram illustrating an example in which an error in which error correction may be impossible is included in the payload of the transmission signal received by the PhyL (300) of the node2.

When an error exceeding FEC correction capability occurs in a Data Payload portion of the PHY format (FIG. 4A (D)) received by the PhyL (300) of the node2, the PDec #0 (62) of the Uplink #3 receives an OAM packet (FIG. 4B (A)) which is erroneously corrected (*1).

In an existing ASA-compliant communication protocol, an OAM packet (FIG. 4B (A)) has no error detection function. Therefore, the PDec #0 (62) is difficult to determine whether or not the received OAM packet (FIG. 4B (A))

is correct data. As a result, in the Downlink #3, the OAM unit (65) may make an inappropriate response to the node1 (*2).

First Embodiment

Figure 11:
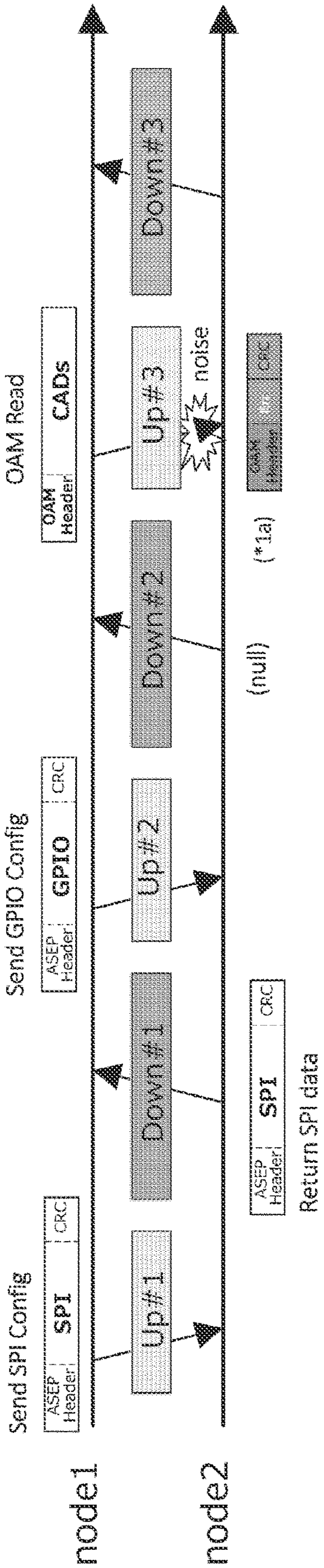
FIG. 11 is a diagram illustrating timing at which a Root device located in the node1 and a Leaf device located in the node2 transmit and receive an Application packet and an OAM packet.
Figure 12:
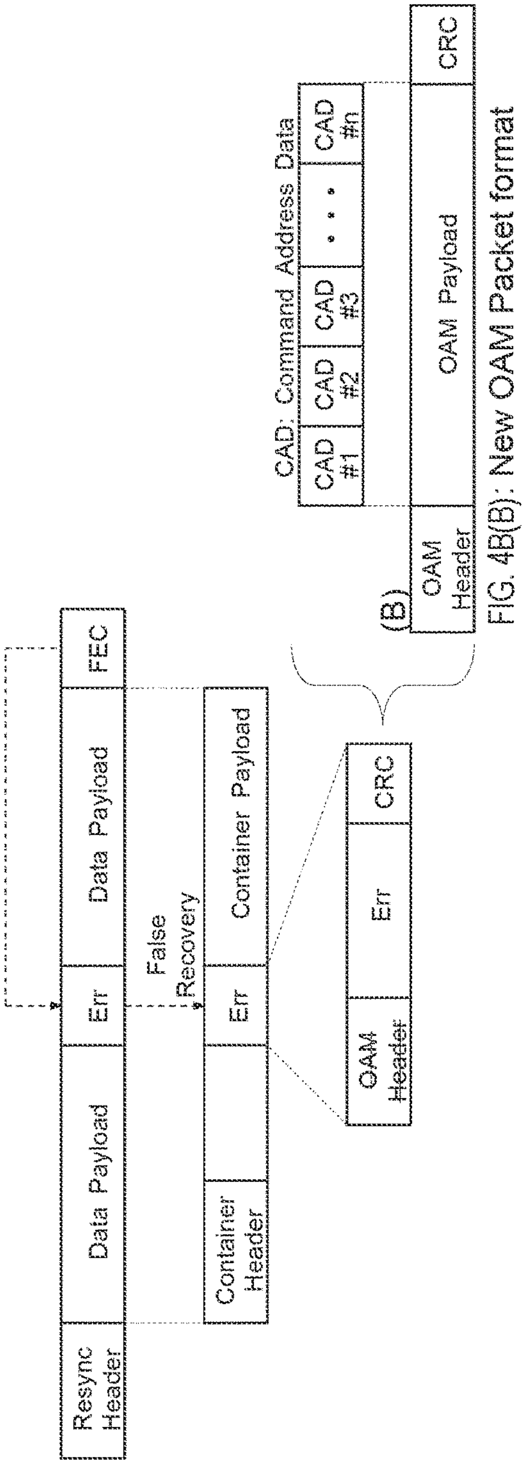
FIG. 12 is a diagram illustrating a configuration of an OAM packet in a first embodiment.

A communication system (3) according to the first embodiment can solve the problems (Hereinafter, a first problem) illustrated in FIGS. 9 and 10. The communication system (3) according to the first embodiment has a block configuration similar to that in FIG. 1, and the Root device (15) and the Leaf device (115) have block configurations similar to those in FIGS. 2 and 3, respectively. Note that, as will be described later, the block configurations of the Root device (15) and the Leaf device (115) according to the first embodiment may be different from those in FIGS. 2 and 3. FIGS. 11 and 12 are diagrams illustrating a first example of solving the first problem illustrated in FIGS. 9 and 10. FIG. 11 is a diagram illustrating timing at which the Root device (15) located at the node1 and the Leaf device (115) located at the node2 transmit and receive an Application packet and an OAM packet. FIG. 12 is a diagram illustrating a configuration of the OAM packet in the first embodiment.

The OAM packet according to the first embodiment has a CRC at the end of the payload, as shown in FIG. 12. The PDec #0 (62) can detect an error of the OAM packet on the basis of the CRC included in the OAM packet input to the DLL (66) (*1a). Therefore, an error included in the OAM packet received from the Root device (15) can be detected by the Leaf device (115).

In the example of FIG. 11, even if the Leaf device (115) can detect that there is an error in the OAM packet transmitted from the Root device (15) to the Leaf device (115), there is no function of notifying the Root device (15). Therefore, such a function may be added.

Figure 13:
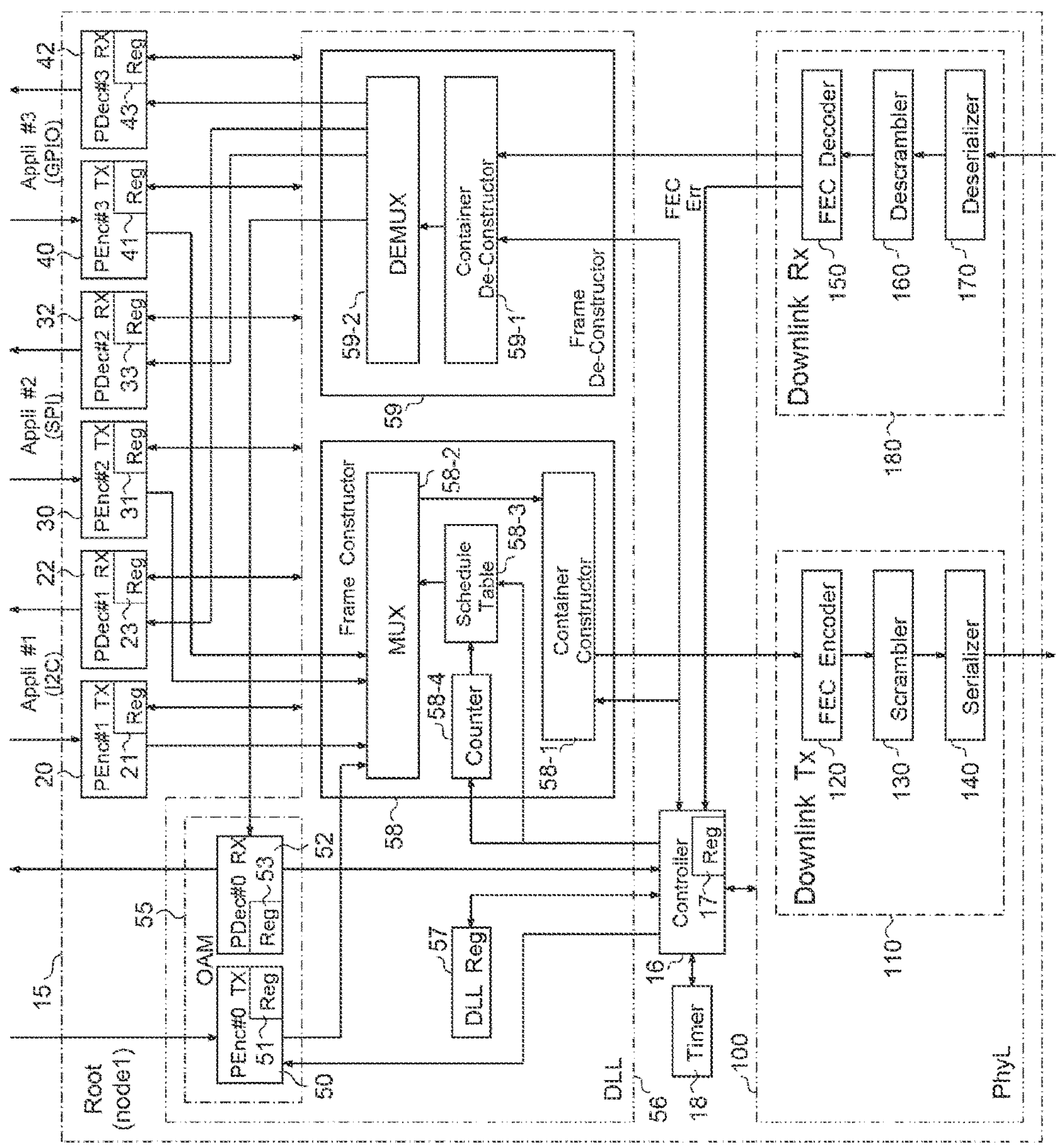
FIG. 13 is a block diagram illustrating an internal configuration of a Root device according to the first embodiment.
Figure 14:
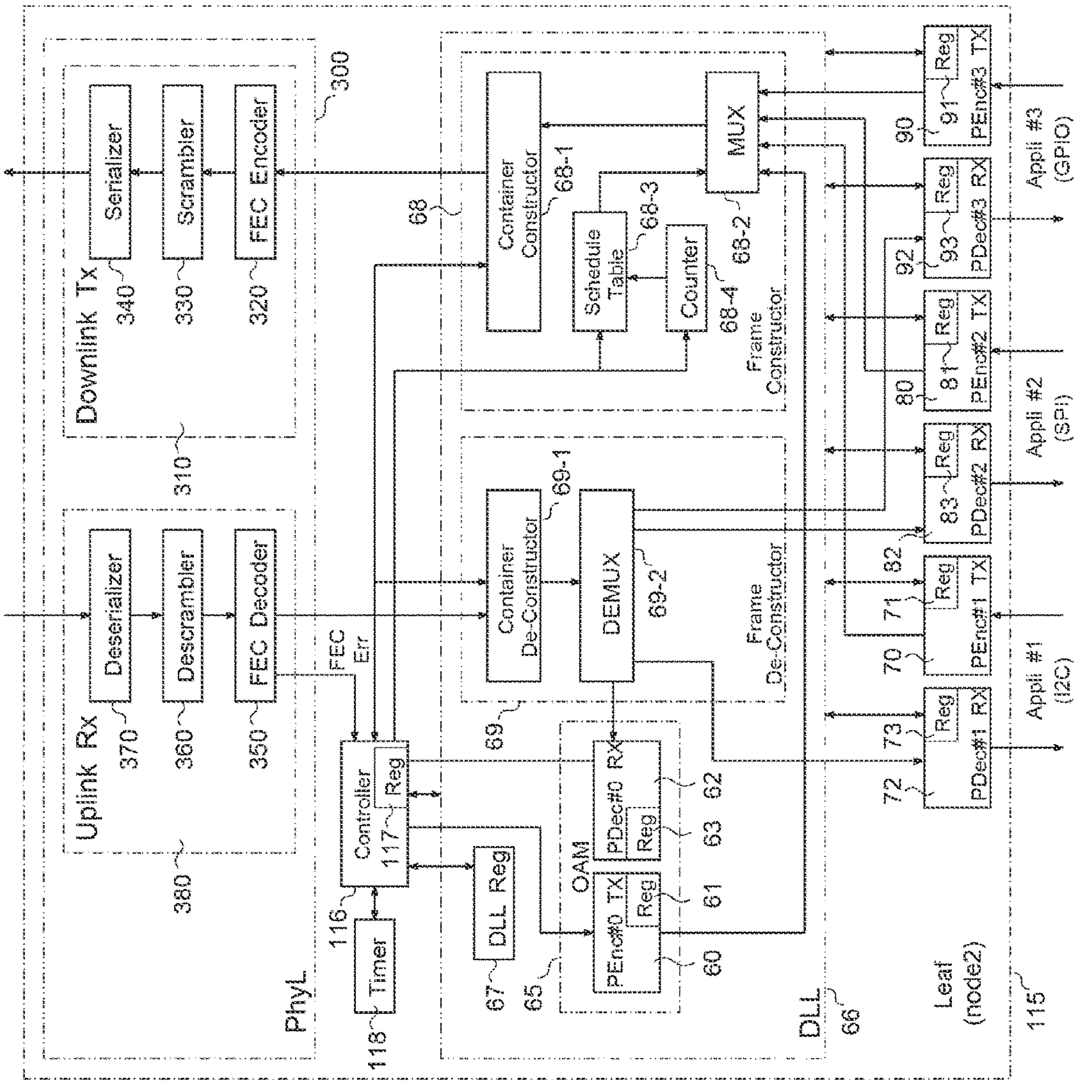
FIG. 14 is a block diagram illustrating an internal configuration of a Leaf device according to the first embodiment.

FIG. 13 is a block diagram illustrating an internal configuration of the root device (15) according to the first embodiment, and FIG. 14 is a block diagram illustrating an internal configuration of the Leaf device (115) according to the first embodiment. In FIGS. 13 and 14, the same components as those in FIGS. 2 and 3 are denoted by the same reference numerals, and differences will be mainly described below.

In the Root device (15) of FIG. 13, when an error is detected in an FEC Decoder (150) in the Downlink Rx (180) of the PhyL (100), the FEC Decoder (150) transmits an error detection signal FEC Err to the Controller (16). The Controller (16) stores the number of times an error is detected in the FEC Decoder (150) in the DLL Register (57) on the basis of the error detection signal FEC Err. Specifically, the DLL Register (57) is provided with an OAM DEC Error Reg that stores the number of times of error detection of the OAM packet.

Similarly, in the Leaf device (115) of FIG. 14, when an error is detected in an FEC Decoder (350) in an Uplink Rx (380) of the PhyL (300), the FEC Decoder (350) transmits an error detection signal FEC Err to the Controller (116). The Controller (116) stores the number of times an error is detected in the FEC Decoder (350) in a DLL Register (67) on the basis of the error detection signal FEC Err.

The PhyL (100) in the Root device (15) in FIG. 13 and the PhyL (300) in the Leaf device (115) in FIG. 14 receive a transmission signal conforming to a predetermined communication protocol from a communication partner apparatus, and perform error correction on a plurality of first packets included in the transmission signal. The plurality of first packets includes, for example, at least one of an application packet or an OAM packet. In this specification, the OAM packet included in the plurality of first packets may be referred to as a first OAM packet.

The DLL (66) in the Leaf device (115) of FIG. 14 separates the plurality of first packets after error correction and generates a second packet including the error correction impossible information of the first packet in which the error correction has not been correctly performed. The second packet is, for example, an OAM Return. In this specification, the OAM Return may be referred to as a second OAM packet. The error correction impossible information is information including a time at which the FEC Error first occurs when the FEC Error indicating that error correction may be impossible by the FEC Decoder has occurred, the number of times of the FEC Error, and the like.

The DLL (66) in the Leaf device (115) has a DLL Register (67) that stores the error correction impossible information. The first OAM packet transmitted by the Root device (15) includes the address information of the DLL Register (67) in which the error correction impossible information is stored.

Figures 15A, 15B:
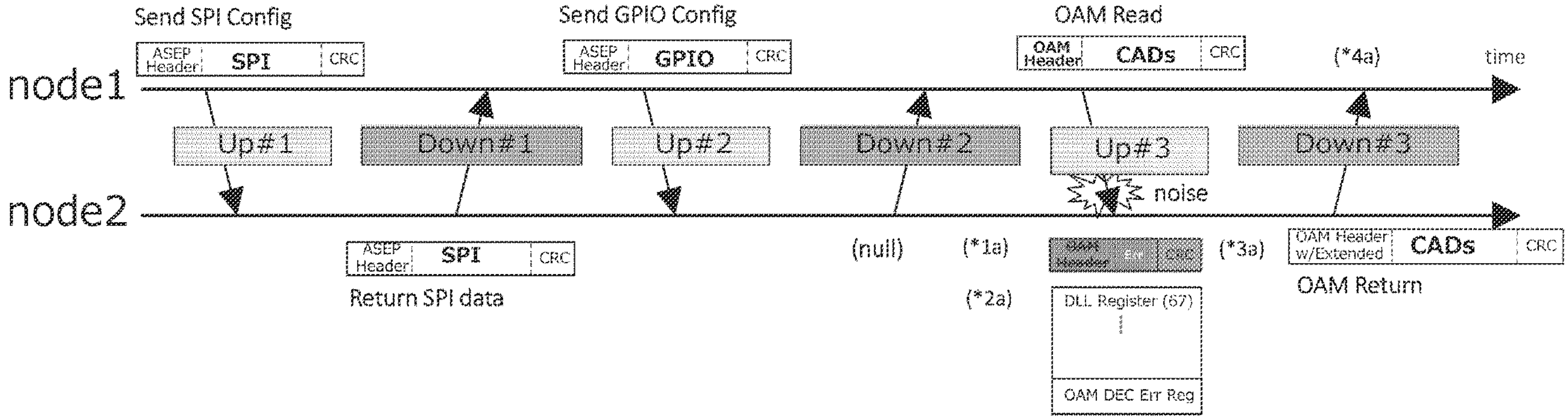
FIG. 15A is a diagram illustrating a second example for solving a first problem illustrated in FIGS. 9 and 10.
FIG. 15B is a diagram illustrating a first configuration example of an extended OAM Header.
Figure 16:
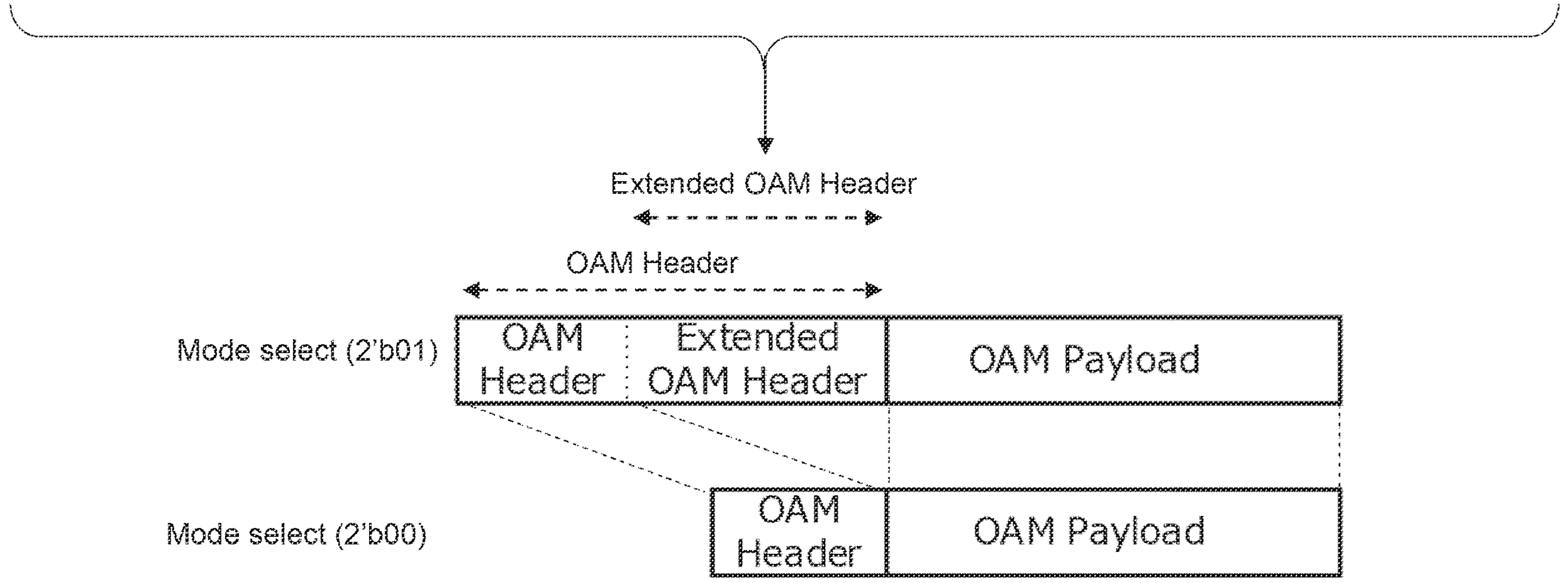
FIG. 16 is a diagram illustrating a relationship between a normal OAM Header and an extended OAM Header.

FIGS. 15A, 15B, and 16 are diagrams illustrating a second example of solving the first problem illustrated in FIGS. 9 and 10. In the Uplink #3, the PDec #0 (62) detects an error in the OAM packet on the basis of the CRC included in the OAM packet (FIG. 4B (A)). When an error is detected (*1a), the PDec #0 (62) transmits an error detection signal FFC Err to the DLL (66). The DLL (66) counts up the value of the OAM DEC Error Reg in the DLL Register (67) (*2a).

In the Downlink #3, the DLL (66) in the node2 generates an OAM packet (Hereinafter, referred to as OAM Return.) for the node1 via the PEnc #0 (60). When the node2 transmits the OAM Return which is a response to the node1, an OAM packet including an extended OAM Header in which the register value of the OAM DEC Err Reg of the PDec #0 (62) is added to the existing OAM Header of the OAM packet is generated (*3a in FIG. 15A, FIG. 15B). The ECU (10) can determine whether or not the OAM Read received by the Leaf device (115) located at the node 2 normally operates from the value of the OAM DEC Err Reg included in the OAM Header received by the Root device (15) located at the node 1 (*4a).

FIGS. 15B and 16 illustrate a first configuration example of the extended OAM Header. The i-th byte of the extended OAM Header is mode select, and is a normal OAM Header when Bit [1: 0] is 00, and is an extended OAM Header when Bit [1: 0] is 01. 1X is Reserved. The subsequent y bytes are information of the extended OAM Header, and Bit [15: 0] of each byte is the number of times of error detection counted up each time the PDec #0 detects an error. Saturation occurs at 0xFF, and returns to 0 at the reset.

As illustrated in FIG. 16, when the extended OAM Header is used, the byte length is longer than that of the normal Header.

When the Leaf device (115) returns an OAM packet to the Root device (15) located at the node1 in the OAM return by using the extended OAM Header, the Root device (15) can learn that an error occurs in the OAM packet previously sent to the Leaf device (115), and can learn the number of OAM packets in which the error occurs. As described above, in the first embodiment, since the CRC is added to the Payload of the OAM packet and transmitted, the error of the OAM packet can be detected on the basis of the CRC on the side that receives the OAM packet. In addition, an OAM DEC Error Reg is provided in the DLL Register (67) of the DLL (66) to store the number of times of error detection of the OAM packet. The value of the OAM DEC Error Reg is recorded in the extended OAM Header when the OAM packet is returned in the OAM Return. Therefore, the Root device (15) that has received the OAM packet of the OAM Return can grasp that the Leaf device (115) has detected the error of the OAM packet previously transmitted to the Leaf device (115) and the number of times of error detection.

Second Embodiment

In an existing ASA-compliant communication system (3), when an Application packet is transmitted from a Root device (15) located at a node1 to a Leaf device (115) located at a node2, even if an FEC Error occurs in the Leaf device (115), there is a problem that the Root device (15) does not notice the FEC Error (Hereinafter, a second problem). Hereinafter, the second problem will be described.

Figure 17:
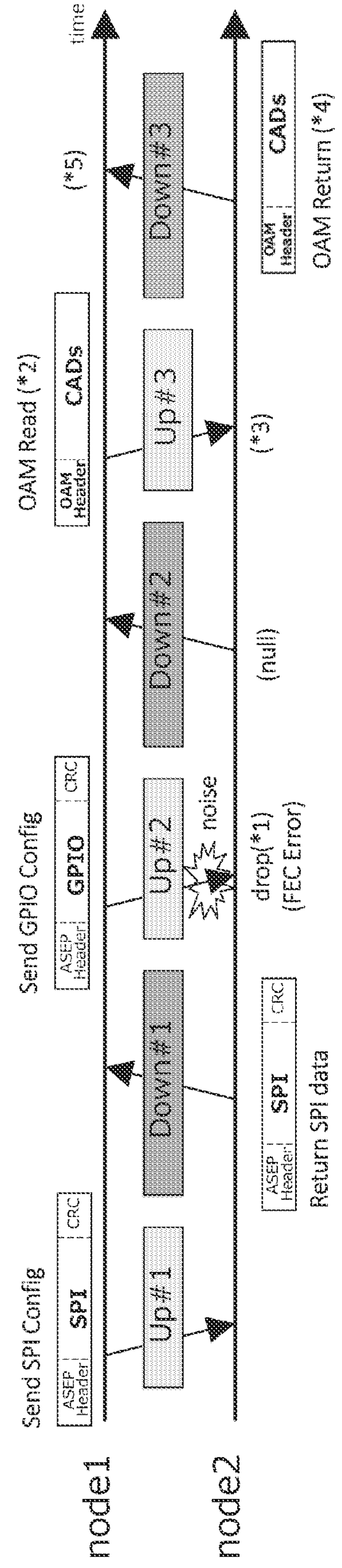
FIG. 17 is a diagram illustrating an example in which an FEC Error occurs.

FIG. 17 is a diagram illustrating an example in which an FEC Error occurs. The FEC Error indicates that an error in which error correction may be impossible occurs in the PDec in the Leaf device (115).

FIG. 17 shows an example in which an FEC Error occurs in the Leaf device (115) while transmitting an application packet from the Root device (15) located at the node1 to the Leaf device (115) located at the node2 in a similar order to FIG. 7.

Since operations of an uplink #1 and a downlink #1 in FIG. 17 are the same as those in FIG. 8, description thereof is omitted. In an Uplink #2, the node1 transmits an Application packet (FIG. 4A (A)) including GPIO Config information to the node2. At this time, it is assumed that an influence of noise or the like is received during transmission. A PhyL (300) of the node2 becomes an FEC Error when the Data Payload of the received PHY format (FIG. 4A (D)) exceeds the error correction limit of the FEC. In this case, the PhyL (300) discards the Data Payload in which the FEC Error has occurred. Therefore, an Application packet including GPIO Config information does not arrive at the PDec #3 (92) (*1).

In a Downlink #2, since there is no Register for recording the occurrence information of the FEC Error in the node2, the node2 is difficult to notify the node1 that the FEC Error has occurred in the node2. Since there is no response data to be transmitted, the node2 transmits null data to the node1.

In the Uplink #3, the ECU (10) transmits an OAM packet (FIG. 4B (B)) including an OAM Read command for checking whether the node2 can normally receive SPI and GPIO Config information to the node2 via the node1 (*2). The node2 receives an OAM packet (FIG. 4B (B)) including an OAM Read command (*3).

In the Downlink #3, the node2 stores the register value of the Read Address specified in CAD of the OAM Read from the received OAM packet (FIG. 4B (A)) in the OAM Payload of the OAM Return (FIG. 4B (B)) and transmits the OAM packet to the node1 (*4).

The ECU (10) checks the result of the OAM Return received by the node1 and checks the Error status at the time of Config write of the node2. If the Error information is not included, the node2 has normally received the Config information, and the ECU (10) can proceed to the next process.

However, in the example of FIG. 17, since there is no Register that records the occurrence information of the FEC Error in the node2, the information of the FEC Error is difficult to be included in the OAM Return.

Therefore, the ECU (10) is difficult to grasp the accurate state of the node2 due to the lack of information even when looking at the information included in the OAM Return received by the node1 (*5).

As described above, in the communication system (3) of FIG. 1 conforming to the existing ASA, there is a problem (second problem) that there is no means for notifying the node1 of the information on the FEC error generated in the node2.

A communication system (3) according to a second embodiment can solve the above-described second problem. A Root device (15) in the communication system (3) according to the second embodiment has a block configuration similar to that in FIG. 13, and a Leaf device (115) has a block configuration similar to that in FIG. 14.

Figure 18:
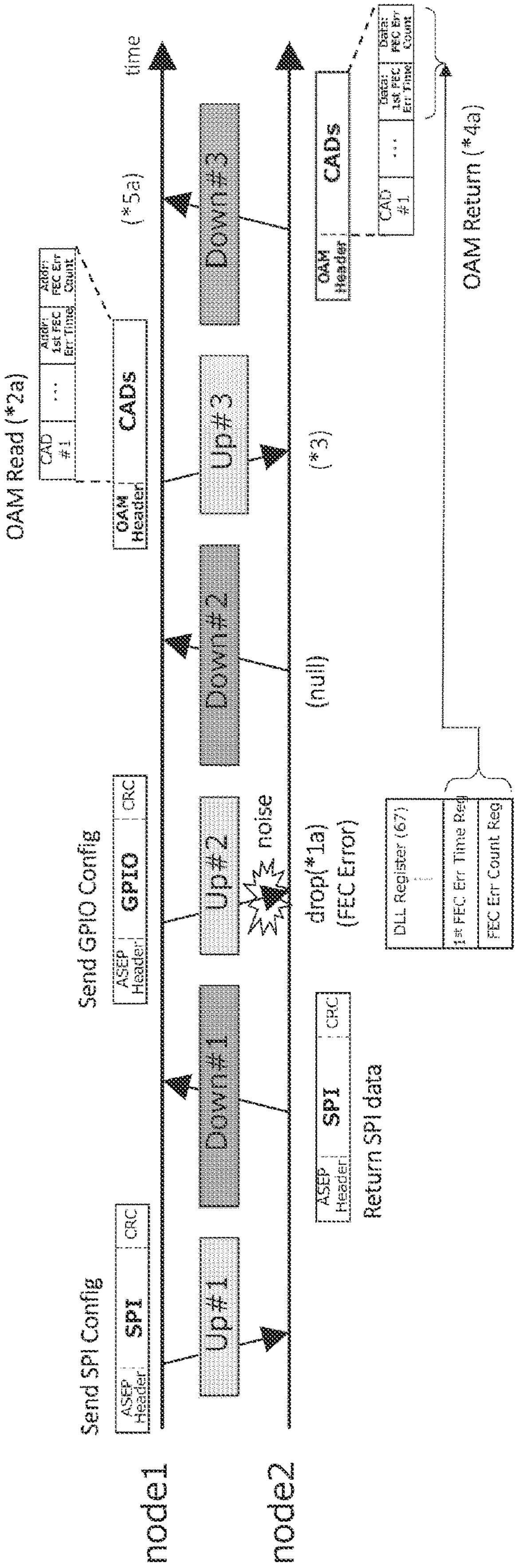
FIG. 18 is a diagram illustrating a first example for solving a second problem.

To the DLL Register (67) of the Leaf device (115) located at the node2, a 1st FEC Err Time Reg and FEC Err Count Reg are newly added. The 1st Err Time Reg is a Register that stores reception time information of an Application packet in which error correction may be impossible first in a transmission unit of a transmission signal. The FEC Err Count Reg is a Register that stores total number information of Application packets in which error correction may be impossible in the transmission unit. FIG. 18 is a diagram illustrating a first example for solving the above-described second problem. FIG. 18 illustrates an example in which an FEC Error occurs at the node2 when an Application packet is transmitted and a GPIO packet is transmitted from the node1 to the node2 in the same order as in FIG. 17.

New Registers (1st FEC Err Time Reg) and (FEC Err Count Reg) are added to the DLL Register (67) of the node2, and the values of the newly added Registers are input to the OAM Payload in the OAM Return and transmitted to the node1.

In the Uplink #2, in the PhyL (300) of the node2, the Data Payload of the received PHY format (FIG. 4A (D)) exceeds the error correction limit of the FEC and becomes an FEC error. In this case, the PhyL (300) discards the Data Payload in which the FEC error has occurred, and notifies the Controller (116) that the FEC error has occurred. The Controller (116) notifies the DLL (66) that the FEC error has occurred, and the DLL (66) writes the occurrence time of the FEC error in the 1st FEC Err Time Reg of the DLL Register (67) in the case of the first FEC error, and does not overwrite in the case where the occurrence time of the FEC error has already been written in the 1st FEC Err Time Reg. In addition, the DLL (66) counts up the FEC Err Count Reg of the DLL Register (67) each time an FEC error occurs (***1*a**).

In the Uplink #3, the ECU (10) transmits, to the node 2 via the node 1, an OAM packet (FIG. 4B (A)) including an OAM Read command for checking whether the node 2 has normally received the SPI and GPIO Config information. The OAM Payload of the OAM packet (FIG. 4B (A)) includes an OAM Read command and a Read Address indicating the 1st FEC Err Time Reg and the FEC Err Count Reg newly added to the DLL Register (67) of the node2 (*2a).

In the Downlink #3, the node2 reads each Register value including the 1st FEC Err Time Reg and the FEC Err Count Reg of the DLL Register (67) according to the Read Address of the OAM Read received from the node1. The node2 adds the read Register value as CAD to the OAM Payload of the OAM Return and transmits the same to the node1 (***4*a**). The OAM Read (first OAM packet) may include n pieces of first address information specifying n pieces of reception time information in the Register and second address information specifying total number information in the Register.

From the OAM Return received by the node1, the ECU (10) can know the number of times of FEC errors occurring in the node2 and the first FEC error occurrence time, and it can be seen that the ECU (10) only needs to send GPIO config information to the node2 (***5*a**).

Figure 19:
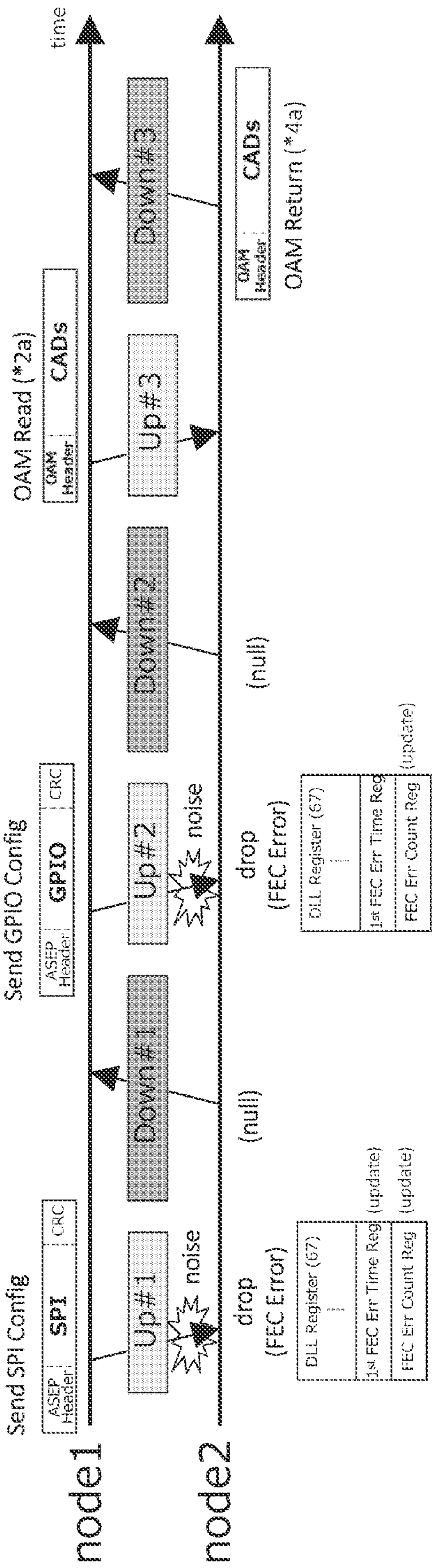
FIG. 19 is a diagram illustrating a second example for solving the second problem.

FIG. 19 is a diagram illustrating a second example for solving the second problem. In the second example, an FEC error occurs in the Uplink #1 and the Uplink #2. In the Uplink #1 in which the first FEC error has occurred, the time when the first FEC error occurs in the Uplink #1 is recorded in the 1st FEC Err Time Reg, and the FEC Err Count is counted up to 1. In the Uplink #2 in which the next FEC error has occurred, since the time of the Uplink #1 has already been recorded in the 1st FEC Err Time Reg, the time of the Uplink #2 is not recorded. However, the FEC Err Count is counted up to 2.

When the result of the DLL Register (67) of the Uplink #2 is transmitted to the node1 by the Downlink #3, the ECU (10) knows that the node2 has not been able to receive the SPI Application packet (FIG. 4A (A)) from the 1st FEC Err Time.

In addition, it is found from the FEC Err Count=2 that there is a possibility that an FEC Error occurs in addition to SPI, and the ECU (10) re-executes Config Write of the Application set from the Error occurrence time (Uplink #1) to the read time (Uplink #3) by the OAM Read command to the node2.

Figure 20:
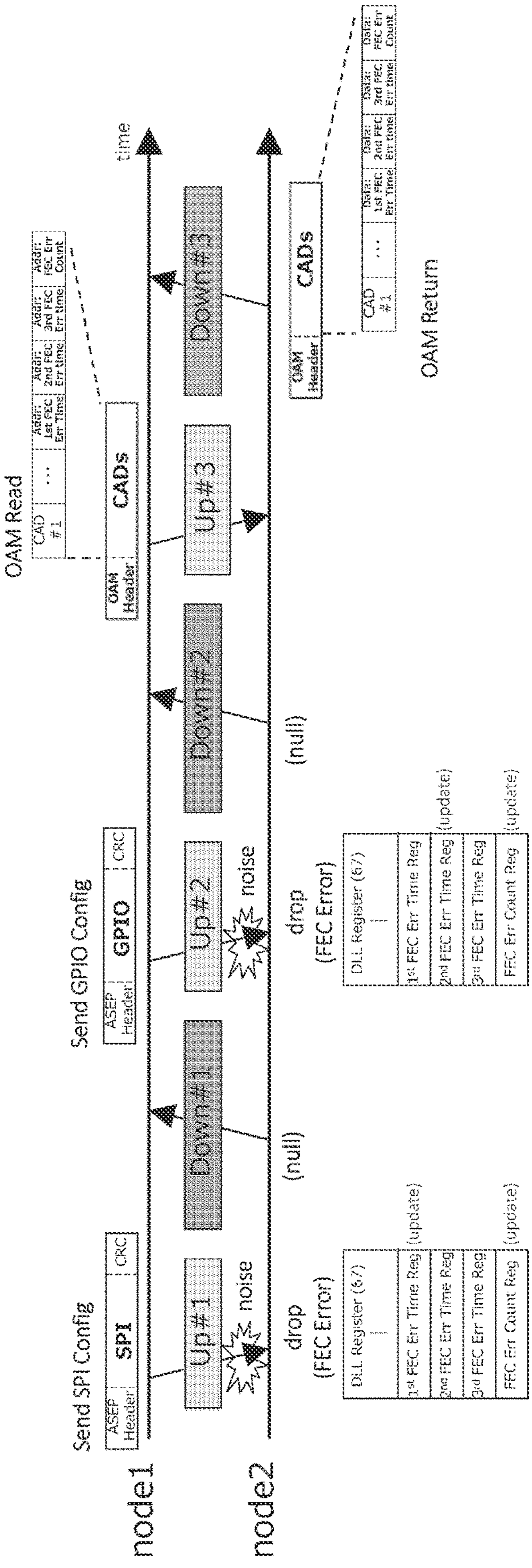
FIG. 20 is a diagram illustrating a third example for solving the second problem.

FIG. 20 is a diagram illustrating a third example for solving the second problem. In the third example, information stored in the DLL Register (67) is different from that in FIGS. 18 and 19. The DLL Register (67) of the third example has three FEC Err Time Reg (1st FEC Err Time Reg, 2nd FEC Time Reg, 3rd FEC Time Reg). Note that how many FEC Err Time Reg are provided is arbitrary. As a result, the time at which the FEC Error has occurred can be recorded in the FEC Err Time Reg in the DLL Register (67) three times from the first FEC Error.

The node1 can read an arbitrary register by the OAM Read. In this example, the 2nd FEC Err Time and the 3rd FEC Err Time are added to the DLL Register (67) of FIG. 18.

The node1 also adds the addresses of the 2nd FEC Err Time and the 3rd FEC Err Time to the Read Address of the OAM Read, so that the node2 also returns the Register values of the 2nd FEC Err Time and the 3rd FEC Err Time to the node1 with the OAM Return. The ECU (10) can know the first and second FEC Error occurrence times (Uplink #1, Uplink #2) and the number of FEC Errors (two times) from the result of the OAM Return received by the node1.

Figure 21:
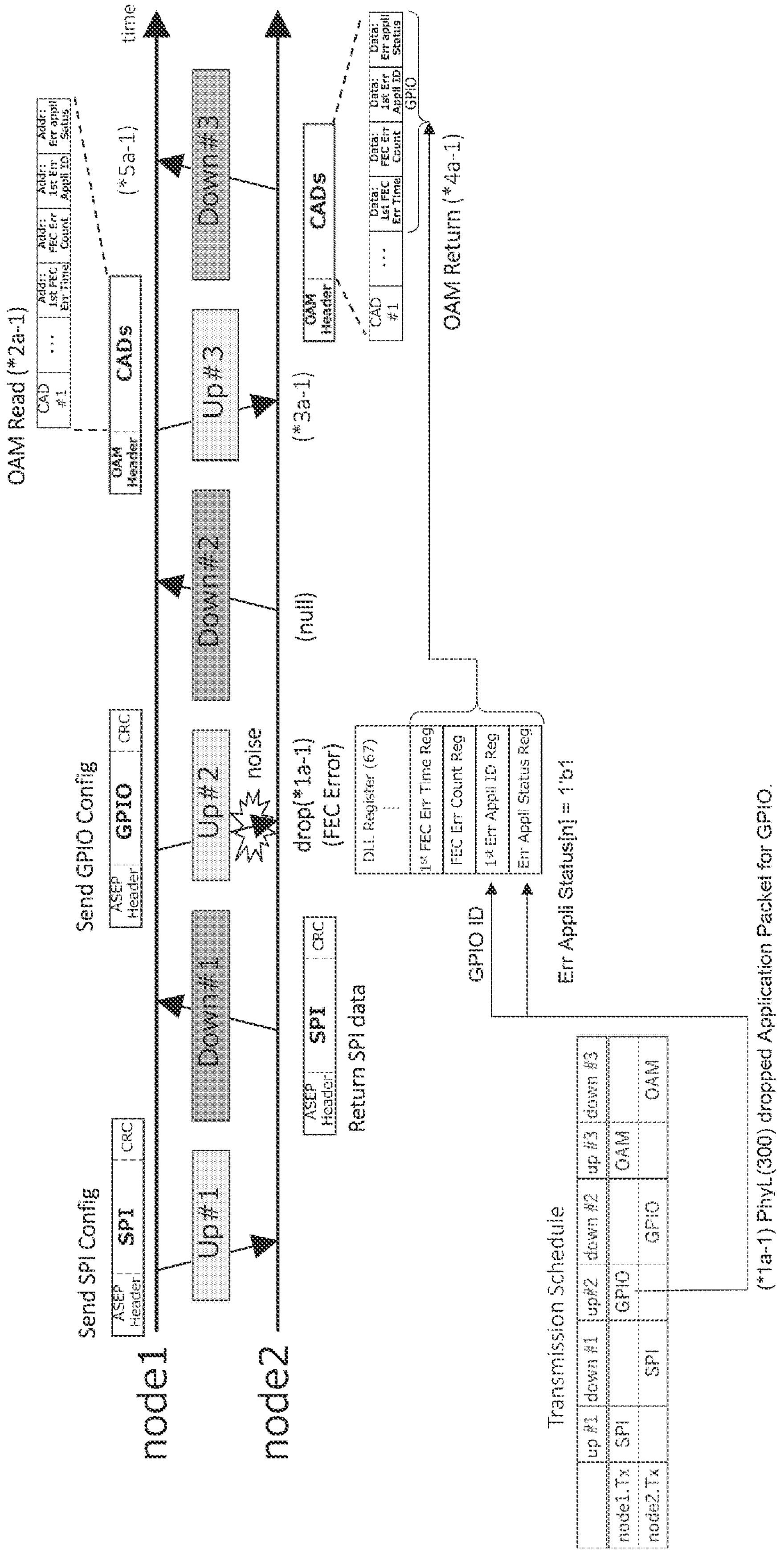
FIG. 21 is a diagram illustrating a fourth example for solving the second problem.

FIG. 21 is a diagram illustrating a fourth example for solving the second problem. In the fourth example, information stored in the DLL Register (67) is different from that in FIGS. 18 to 20.

In order to know the Application packet that is difficult to be received, the DLL (66) of the Leaf device (115) located at the node 2 has a function of sharing the Transmission Schedule information illustrated in FIG. 7 of the Root device (15) located at the node 1.

The DLL register (67) of the fourth example includes a 1st Err Appli ID reg and an Err Appli Status Reg in addition to the 1st FEC Err Time Reg and the FEC Err Count Reg. The 1st Err Appli ID Reg stores the ID (identification number) of the Application packet that first caused the FEC Error. The Err Appli Status Reg includes bit information indicating whether or not each Application packet has caused an FEC Error. An individual Application packet is allocated to each bit of the Err Appli Status Reg, and whether or not an FEC Error has occurred in the corresponding Application packet can be known by a value of each bit. These pieces of information are transmitted to the Root device (15) located at the node1.

The Root device (15) located at the node1 transmits an OAM Read (first OAM packet) including first to fourth address information to the Leaf device (115) located at the node2. The first address information is address information specifying a 1st FEC Err Time Reg. The second address information is address information specifying an FEC Err Count Reg. The third address information is address information specifying a 1st Err Appli ID reg. The fourth address information is address information specifying an Err Appli Status Reg.

In the first to third examples described above, the ECU (10) needs to specify the transmission content from the time when the FEC Error included in the OAM Return occurs. In contrast, in the fourth example, the Application ID or the Err Appli Status in which the FEC Error has occurred can be directly provided to the ECU (10).

In the Uplink #2 of FIG. 21, the PhyL (300) of the node2 causes an FEC Error because the Data Payload of the received PHY format (FIG. 4A (D)) exceeds the error correction limit of the FEC. Therefore, an FEC Decoder (350) of FIG. 14 discards the Data Payload in which the FEC Error has occurred, and notifies the Controller (116) that the FEC Error has occurred.

The Controller (116) notifies the DLL (66) that the FEC Error has occurred, and the DLL (66) writes the occurrence time of the FEC Error when the 1st FEC Err Time Reg of the DLL Register (67) is in the initial state, and does not overwrite when the occurrence time of the FEC Error has already been written in the 1st FEC Err Time Reg. In addition, the DLL (66) counts up the FEC Err Count Reg of the DLL Register (67) each time an FEC Error occurs.

When an FEC Error occurs, DLL (66) refers to the Transmission Schedule (FIG. 7) of the shared node1 and specifies a time slot of an Application packet for GPIO which is originally sent on the basis of an occurrence time of the FEC Error. When the ID of the GPIO affected by the FEC Error is specified, the DLL (66) writes and holds 1'b1 indicating an error flag in the corresponding bit of the FEC Error Status of the DLL Register (67). In this example, an Err Appli Status [3] is a bit indicating an ID of an Application packet for GPIO.

The DLL (66) writes an ID (Error Application ID) of an Application packet affected by an FEC Error when the 1st Err Appli ID Reg of the DLL Register (67) is in an initial state, and does not overwrite when the Error Application ID has already been written in the 1st Err Appli ID Reg (*1a-1).

In the Uplink #3, as information for checking whether the node2 has correctly received Config information, the node1 includes the Read Addresses of the 1st FEC Err Time Reg, FEC Err Count Reg, 1st Err Appli ID Reg, and Err Appli Status of the node2 in the OAM Payload of the OAM packet (FIG. 4B (A)) and transmits the OAM packet to the node2 (*2a-1). The node2 receives the OAM packet (FIG. 4B (A)) including an OAM Read command (*3a-1).

In the Downlink #3, the node2 reads each Register value including the 1st FEC Err Time Reg, FEC Err Count Reg, 1st Err Appli ID Reg, and Err Appli Status of the DLL Register (67) according to the Read Address received from the node1.

The node2 adds the read Register value to the OAM Payload of the OAM Return as CAD and transmits the same to the node1 (*4a-1).

Figure 22:
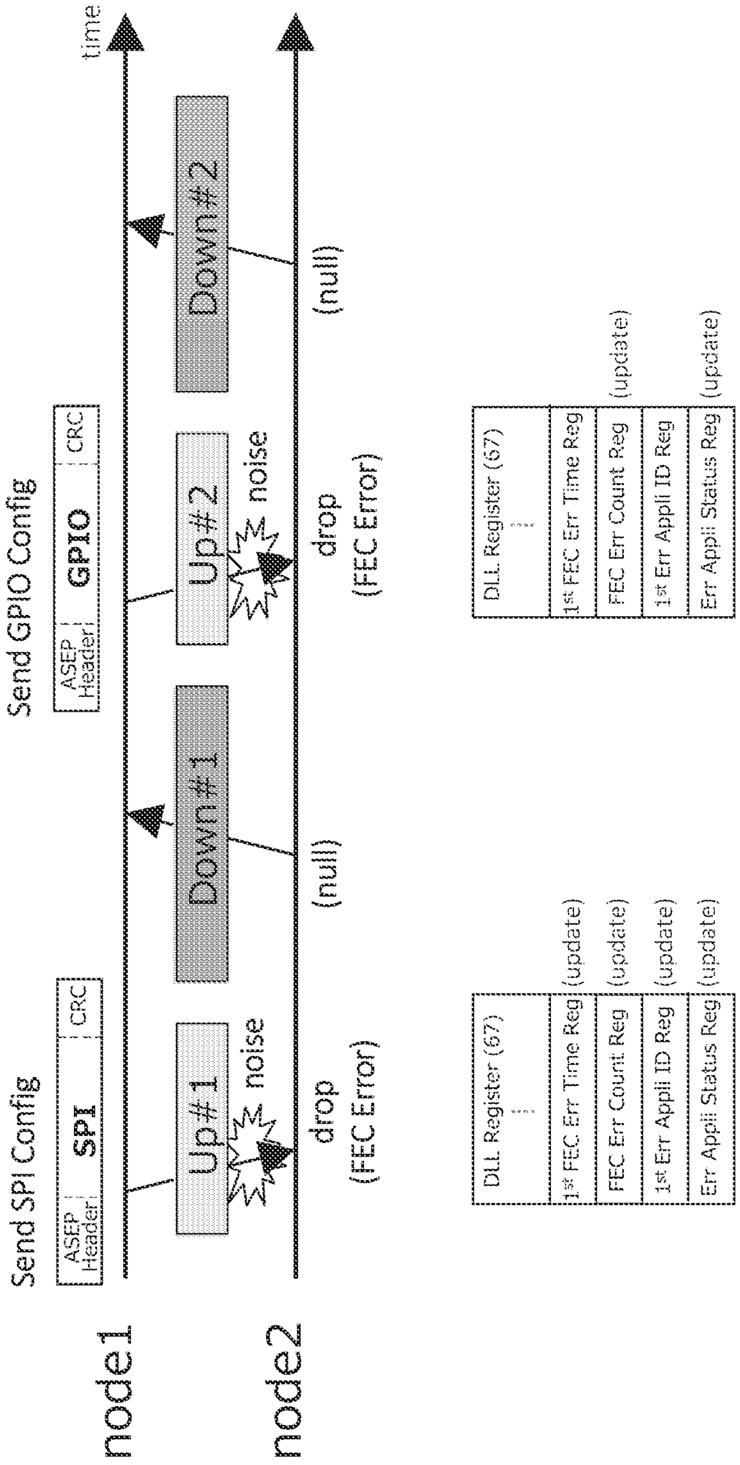
FIG. 22 is a diagram illustrating a fifth example for solving the second problem.

From the OAM Return received by the node1, the ECU (10) can grasp the number of times of FEC Errors having occurred in the node2, the occurrence time of the first FEC Error, and the affected application information (in this example, the GPIO is the first FEC Error) (*5a-1). FIG. 22 is a diagram illustrating a fifth example for solving the second problem. The fifth example illustrates an example in which an FEC Error occurs in the Uplink #1 and Uplink #2. In the Uplink #1, the time of Uplink #1 in which the first FEC Error has occurred is recorded in the 1st FEC Err Time Reg, and the FEC Err Count Reg is counted up to 1. The Application ID of SPI originally to be received by the node2 is recorded in the 1st Err Appli ID Reg, and 1'b1 is also recorded in the Err Appli Status [n] indicating SPI.

In the Uplink #2, since an FEC Error Occurrence Time of the Uplink #1 has already been recorded in the 1st FEC Err Time Reg, the FEC Error Occurrence Time of the Uplink #2 is not recorded. However, the FEC Err Count Reg is counted up to 2.

In the 1st Err Appli ID Reg, the Application ID of SPI that should have been already received by the Uplink #1 is recorded, and therefore the GPIO ID of the Uplink #2 is not recorded. However, 1'b1 is recorded in the Err Appli Status [m] indicating GPIO.

When the result of the DLL Register (67) of the Uplink #2 is transmitted to the node1 by the Downlink #3, it can be seen that the ECU (10) fails to perform SPI and GPIO Config transmission from the Err Appli Status [m: n]=2'b11 and FEC Err Count=2. Therefore, the ECU (10) only needs to re-execute Config write of Application whose configuration has failed to the node2.

As described above, in the second embodiment, the 1st FEC Err Time Reg that stores, when the FEC Error of the Application packet is detected on the node2 side at the time of transmitting the Application packet from the node1 to the node2, the time when the FEC Error occurs first, and the FEC Err Count Reg that stores the number of FEC Errors are provided in the DLL Register (67). The values of these Registers are sent to the node1 in an OAM packet. Therefore, in the node1, it is possible to grasp in which Application packet the FEC Error has occurred first and how many times the FEC Error has occurred.

Third Embodiment

In the second embodiment, the FEC Error information is included in the Payload of the OAM packet of OAM Return. However, when the FEC Error information is included in the Payload, the Payload becomes long, and it takes time and effort to read the Payload on the node1 side. In addition, on the node1 side, it is necessary to include the address information of the DLL Register (67) that stores the 1st FEC Err Time and the FEC Err Count in the OAM Read, and the number of issues of CAD becomes long. Therefore, the communication system (3) according to the third embodiment returns the FEC Error information from the node2 to the node1 by a simpler method than the second embodiment.

Figure 23:
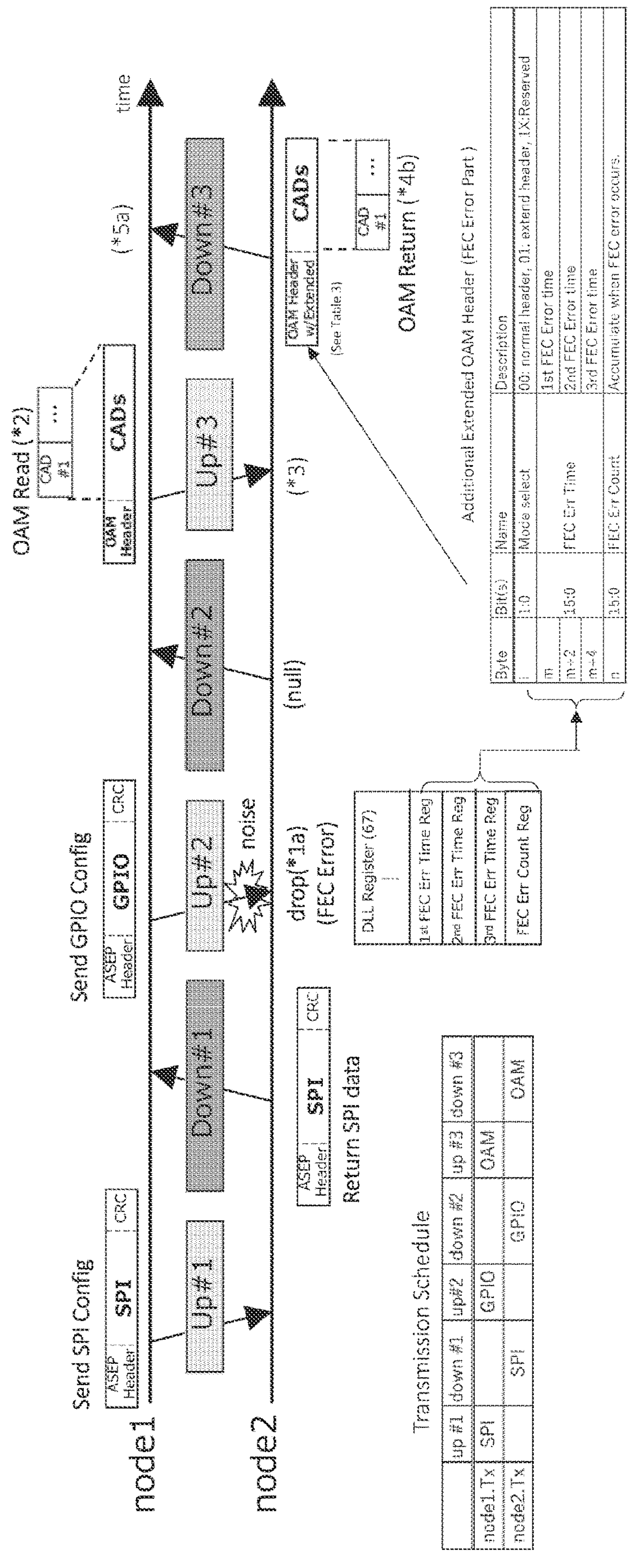
FIG. 23 is a diagram illustrating timing of a communication system according to a third embodiment.

FIG. 23 is a diagram illustrating timings of the communication system (3) according to the third embodiment. An Uplink #1, a Downlink #1, and an Uplink #2 are similar to those in FIG. 18 (*1a). FIG. 23 illustrates an example in which the GPIO packet transmitted from the node 1 causes the FEC Error in the node 2 in the Uplink #2.

In the third embodiment, the OAM Header of the OAM Return is replaced with an Extended OAM Header. FIGS. 24 and 25 are diagrams illustrating a second configuration example of the Extended OAM Header. As illustrated in FIG. 24, Bit [1: 0] of the i-th byte is Mode select, 00 is a normal OAM Header, 01 is an Extended OAM Header, and 1X is reserved. A 1st FEC Error time is recorded in Bit [15: 0] of the m-th byte. A 2nd FEC Error time is recorded in Bit [15: 0] of the (m+2)-th byte. A 3rd FEC Error time is recorded in Bit [15: 0] of the (m+4)-th byte. An FEC Error Count is recorded in Bit [15: 0] of the n-th byte.

In FIG. 25, the Extended OAM Header of FIG. 24 further includes an FEC Error Application ID and an FEC Error Application Status. A 1st FEC Error Application ID is recorded in the o-th byte of the Extended OAM Header, a 2nd FEC Error Application ID is recorded in the (o+2)-th byte, and a 3rd FEC Error Application ID is recorded in the (o+4)-th byte. FEC Err Appli Status [15: 0] is recorded in the p-th byte, FEC Err Appli Status [31: 16] is recorded in the (p+2)-th byte, FEC Err Appli Status [47: 32] is recorded in the (p+4)-th byte, and FEC Err Appli Status [63: 48] is recorded in the (p+6)-th byte of the Extended OAM Header.

In the Uplink #3 of FIG. 23, the ECU (10) transmits an OAM packet (FIG. 4B (A)) to the node 2 via the node 1 (*2). The node2 receives the OAM packet (FIG. 4B (A)) including an OAM Read command (*3).

In the Downlink #3, the node2 reads the values of the 1st FEC Err Time Reg and the FEC Err Count Reg of the DLL Register (67). The node2 inserts the read Register value into the Extended OAM Header (Extended OAM Header), adds the value of the Read Register specified in CAD to the OAM Payload, and transmits the resulting OAM payload to the node1 (*4b).

The ECU (10) can learn the number of times of FEC Error having occurred in the node2 and the first FEC Error occurrence time from the OAM Return received by the node1 (115), and it can be seen that the ECU (10) needs to send only GPIO config information to the node2 (*5a).

As described above, in the third embodiment, since the FEC Error information is returned to the node1 in the Extended OAM Header, it is not necessary to include the address information of the FEC Error information in the OAM Read transmitted by the node1 to the node2.

Fourth Embodiment

Figures 26, 27:
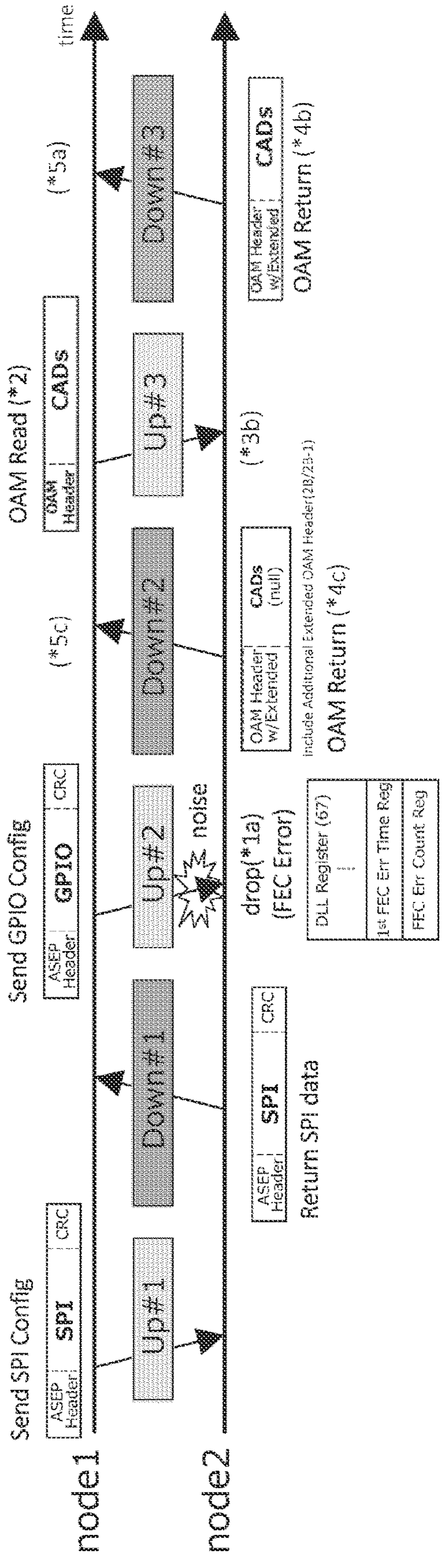
FIG. 26 is a timing diagram of a communication system according to a fourth embodiment.
FIG. 27 is a diagram illustrating a Transmission Schedule in which an allocation of a Downlink #2 is changed from GPIO to OAM.

The DLL (66) has a function of allocating OAM instead when there is no transmission data of the Application allocated to the TDD time slot for each certain period. Therefore, the FEC Error information can be returned by the OAM Return immediately after the FEC Error occurs. FIG. 26 is a timing diagram of the communication system (3) according to the fourth embodiment. New registers (1st FEC Err Time Reg) and (FEC Err Count Reg) are added to the DLL Register (67) of the node2, and the node2 has a function of transmitting the value of the additional register to the node1 in the Extended OAM Header of the OAM packet. Any command in the OAM packet that transmits the Extended OAM Header may be used, but in this example, it is referred to as an OAM Return.

An Uplink #1, a Downlink #1, and an Uplink #2 in FIG. 26 are similar to those in FIG. 18 (*1a). In FIG. 18, since there is no response data to be transmitted by the node2, null data is transmitted to the node1. On the other hand, in FIG. 26, when there is no transmission data of the Application allocated to the time slot of the Downlink #2, the DLL (66) is reallocated to the time slot of OAM instead. FIG. 27 is a diagram illustrating a Transmission Schedule in which the allocation of the Downlink #2 is changed from GPIO to OAM.

The DLL (66) inserts the read values of the 1st FEC Err Time Reg and the FEC Err Count Reg into the Extended OAM Header of the OAM Return, adds empty OAM Payload, and transmits the resulting OAM Header to the node1. (*4c) The ECU (10) reads the result of the OAM Return received by the node1. The ECU (10) can know the number of times of FEC Error having occurred in the node2 and the first FEC Error occurrence time from the read result.

In the second and third embodiments, the FEC Error information of the node2 is transmitted to the node1 by the Downlink #3 after issuing the OAM Read. However, in FIG. 26, notification of the FEC Error information of the node2 can be provided by the Downlink #2 even if the OAM Read is not issued. As a result, it is possible to notify the node1 that an FEC Error has occurred in the node2 with lower latency than in the second and third embodiments (*5c).

FIG. 28 is a diagram illustrating a configuration of an Extended OAM Header of an OAM Return. The Extended OAM Header in FIG. 28 is the same as that in FIG. 25 except for the y-th bit. The y-th bit of the Extended OAM Header in FIG. 28 is an OAM DEC Error that counts the number of times of FEC error detection. It is saturated at 0xFFFF and returns to 0 by reset.

Although FIG. 26 illustrates the example in which the FEC Error information is included in the Extended OAM Header of the OAM Return, the FEC Error information may be included in the OAM Payload.

Figure 29:
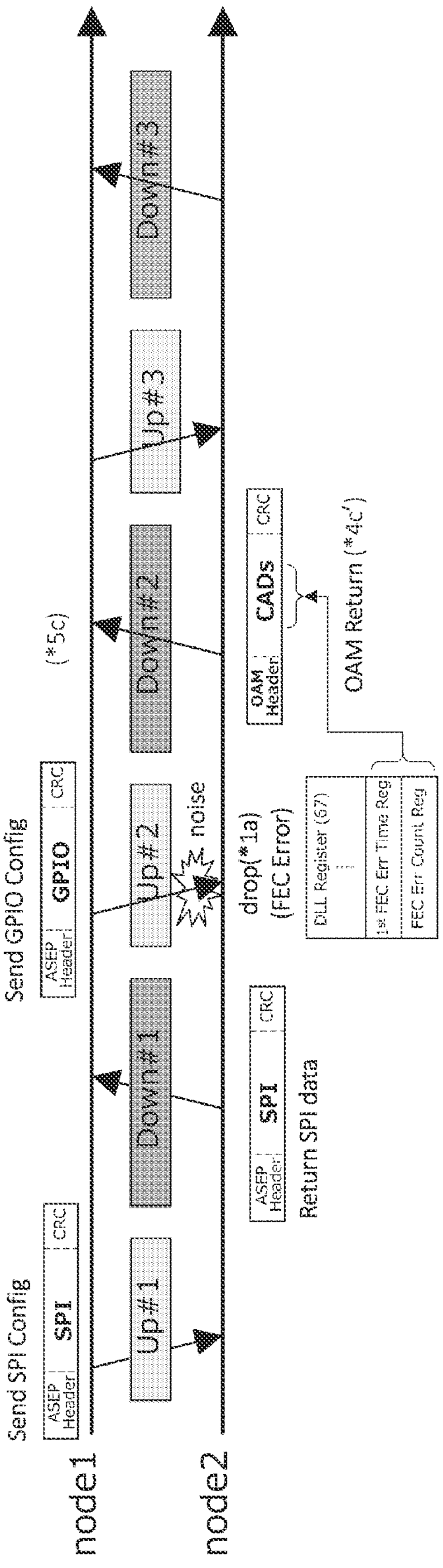
FIG. 29 is a timing chart when FEC Error information is included in an OAM Payload of the OAM return.

FIG. 29 is a timing chart when FEC Error information is included in an OAM Payload of the OAM Return. FIG. 29 illustrates an example in which an FEC Error occurs at the node2 when a GPIO packet is transmitted from the node1 to the node2 by the Uplink #2. In the DLL Register (67) in the DLL (66) of the node2, 1st FEC Err Time Reg and FEC Err Count Reg are provided. The values of these Registers are included in the OAM Payload of the OAM Return and transmitted to the node1 in the Downlink #2 (*4c').

As described above, in the fourth embodiment, since the FEC Error information is returned from the node2 to the node1 in the OAM Return immediately after the FEC Error occurs, the node1 can quickly grasp that the FEC Error has occurred.

Note that, the present technology can also adopt the following configurations.

(1) A communication apparatus including:

a PHY that receives a first transmission signal conforming to a predetermined communication protocol from a communication partner apparatus and performs error correction on a plurality of first packets included in the first transmission signal; and a LINK that separates the plurality of first packets after error correction and generates a second packet including error correction impossible information of the first packet on which the error correction has not been correctly performed, in which the PHY transmits a second transmission signal including the second packet to the communication partner apparatus.

(2) The communication apparatus according to (1), in which the plurality of first packets includes at least one of an application packet or a first operation, administration, and maintenance (OAM) packet, and the second packet includes a second OAM packet.

(3) The communication apparatus according to (2), in which the LINK includes a register that stores the error correction impossible information, and the first OAM packet includes address information of the register in which the error correction impossible information is stored.

(4) The communication apparatus according to (3), in which the second OAM packet includes a header and a payload, and the payload of the second OAM packet includes the error correction impossible information.

(5) The communication apparatus according to (3) or (4), in which the error correction impossible information includes reception time information of an application packet in which error correction may be impossible first in a transmission unit of the transmission signal and total number information of application packets in which error correction may be impossible in the transmission unit, and the address information in the first OAM packet includes first address information specifying the reception time information in the register and second address information specifying the total number information in the register.

(6) The communication apparatus according to (3) or (4), in which the error correction impossible information includes reception time information of n (n is an integer of 1 or more) application packets in which error correction may be impossible from the beginning in a transmission unit of the transmission signal and total number information of application packets in which error correction may be impossible in the transmission unit, and the address information in the first OAM packet includes the n pieces of first address information specifying the n pieces of reception time information in the register and second address information specifying the total number information in the register.

(7) The communication apparatus according to (3) or (4), in which the error correction impossible information includes reception time information of an application packet in which error correction may be impossible first in a transmission unit of the transmission signal, total number information of application packets in which error correction may be impossible in the transmission unit, identification information of an application packet in which error correction may be impossible first in a transmission unit of the transmission signal, and bit string information in which whether or not error correction may be impossible is allocated to each application packet transmitted in the transmission unit in units of bits, and the address information in the first OAM packet includes first address information specifying the reception time information in the register, second address information specifying the total number information in the register, third address information specifying the identification information in the register, and fourth address information specifying the bit string information in the register.

(8) The communication apparatus according to any one of (2) to (7), in which the LINK includes an OAM unit that decodes the first OAM packet and generates the second OAM packet, the first OAM packet includes an error detection code, and the PHY detects an error in the first OAM packet on the basis of the error detection code and outputs an error detection signal.

(9) The communication apparatus according to (8), further including a number-of-times storage unit that stores a number of times of detection of an error of the first OAM packet by the OAM unit for each transmission unit of the transmission signal, in which the second OAM packet includes information of the number of times stored in the number-of-times storage unit.

(10) The communication apparatus according to (9), in which the second OAM packet includes the error correction impossible information read from the number-of-times storage unit on the basis of the address information.

(11) The communication apparatus according to any one of (2) to (10), in which the second OAM packet includes the error correction impossible information.

(12) The communication apparatus according to (11), in which the second OAM packet includes a header and a payload, the payload of the second OAM packet includes the error correction impossible information, and the payload of the second OAM packet has a byte length corresponding to an amount of the error correction impossible information.

(13) The communication apparatus according to (10), in which the second OAM packet includes a header and a payload, and a length of the header of the second OAM packet is different between a case of including the error correction impossible information and a case of not including the error correction impossible information.

(14) The communication apparatus according to any one of (2) to (13), in which the second OAM packet is transmitted to the communication partner apparatus as a response to the first OAM packet from the communication partner apparatus.

(15) The communication apparatus according to any one of (2) to (14), in which the second OAM packet is transmitted to the communication partner apparatus each time it is determined that error correction of the first packet may be impossible in the PHY.

(16) The communication apparatus according to any one of (1) to (15), in which the plurality of first packets includes at least one of an I2C packet, an SPI packet, or a GPIO packet.

(17) The communication apparatus according to any one of (1) to (16), in which information is alternately transmitted and received to and from the communication partner apparatus within a period allocated by a time division duplex (TDD) communication system.

(18) A communication apparatus including:

a LINK that generates a transmission packet including a plurality of first packets; and a PHY that generates a first transmission signal conforming to a predetermined communication protocol on the basis of the transmission packet, transmits the first transmission signal to a communication partner apparatus, and receives a second transmission signal from the communication partner apparatus, in which the LINK restores a second packet on the basis of the second transmission signal, the plurality of first packets includes at least one of an application packet or a first operation, administration, and maintenance (OAM) packet, and the second packet includes error correction impossible information of the first packet in which the communication partner apparatus has failed to correctly perform error correction.

(19) A communication system including:

a first communication apparatus; and a second communication apparatus that alternately transmits and receives information to and from the first communication apparatus within a period allocated by a time division duplex (TDD) communication system, in which the first communication apparatus includes: a first LINK that generates a first transmission packet including a plurality of first packets; and a first PHY that generates a first transmission signal conforming to a predetermined communication protocol on the basis of the first transmission packet, transmits the first transmission signal to the second communication apparatus, and receives a second transmission signal from the second communication apparatus, the second communication apparatus includes:

a second PHY that receives the first transmission signal conforming to the communication protocol from the first communication apparatus and performs error correction on a plurality of first packets included in the first transmission signal; and a second LINK that separates the plurality of first packets after error correction and generates a second packet including error correction impossible information of the first packet on which error correction has not been correctly performed, and the second PHY transmits the second transmission signal including the second packet to the first communication apparatus.

(20) A communication method including:

receiving a first transmission signal conforming to a predetermined communication protocol from a communication partner apparatus, and performing error correction on a plurality of first packets included in the first transmission signal;

separating the plurality of first packets after error correction and generating a second packet including error correction impossible information of the first packet in which the error correction has not been correctly performed; and transmitting a second transmission signal including the second packet to the communication partner apparatus.

Aspects of the present disclosure are not limited to the above-described embodiments, but include various modifications that can be conceived by a person skilled in the art, and the effects of the present disclosure are not limited to the above-described contents. That is, various additions, modifications, and partial deletions can be made without departing from the conceptual idea and gist of the present disclosure derived from the contents defined in the claims and equivalents thereof. It should be understood by those skilled in the art that various modifications, combinations, sub-combinations and alterations may occur depending on design requirements and other factors insofar as they are within the scope of the appended claims or the equivalents thereof.

REFERENCE SIGNS LIST

3 Communication system
4 Cable
15 Device
16 Controller
17 Control register
18 Timer
55 OAM unit
57 Register
58 Frame constructor
58-1 Container constructor
58-3 Schedule table

58-4 Counter
65 OAM unit
67 DLL register
68 Frame constructor
69-1 Container de-constructor
110 Uplink Tx
115 Device
116 Controller
118 Timer
150 FEC Decoder
180 Downlink Rx
200 Camera
310 Downlink Tx
350 FEC Decoder
380 Uplink Rx

The invention claimed is:

1. A communication apparatus comprising:

a physical layer (PHY) that receives a first transmission signal conforming to a predetermined communication protocol from a communication partner apparatus and performs error correction on a plurality of first packets included in the first transmission signal;

a link layer (LINK) that separates the plurality of first packets after error correction and generates a second packet including error correction impossible information of at least one of the plurality of first packets on which the error correction has not been correctly performed, wherein the PHY transmits a second transmission signal including the second packet to the communication partner apparatus, the plurality of first packets includes at least one of an application packet or a first operation, administration, and maintenance (OAM) packet, the second packet includes a second OAM packet, the LINK includes an OAM unit that decodes the first OAM packet and generates the second OAM packet, the first OAM packet includes an error detection code, and the PHY detects an error in the first OAM packet on a basis of the error detection code and outputs an error detection signal; and a number-of-times storage unit that stores a number of times of detection of an error of the first OAM packet by the OAM unit for each transmission unit of the first transmission signal, wherein the second OAM packet includes information of the number of times stored in the number-of-times storage unit.

2. The communication apparatus according to claim 1, wherein the LINK includes a register that stores the error correction impossible information, and the first OAM packet includes address information of the register in which the error correction impossible information is stored.

3. The communication apparatus according to claim 2, wherein the second OAM packet includes a header and a payload, and the payload of the second OAM packet includes the error correction impossible information.

4. The communication apparatus according to claim 2, wherein the error correction impossible information includes reception time information of an application packet in which error correction may be impossible first in a transmission unit of the first transmission signal and total number information of application packets in which error correction may be impossible in the transmission unit, and the address information in the first OAM packet includes first address information specifying the reception time information in the register and second address information specifying the total number information in the register.

5. The communication apparatus according to claim 2, wherein the error correction impossible information includes reception time information of n (n is an integer of 1 or more) application packets in which error correction may be impossible from a beginning in a transmission unit of the first transmission signal and total number information of application packets in which error correction may be impossible in the transmission unit, and the address information in the first OAM packet includes n pieces of first address information specifying n pieces of reception time information in the register and second address information specifying the total number information in the register.

6. The communication apparatus according to claim 2, wherein the error correction impossible information includes reception time information of an application packet in which error correction may be impossible first in a transmission unit of the first transmission signal, total number information of application packets in which error correction may be impossible in the transmission unit, identification information of an application packet in which error correction may be impossible first in a transmission unit of the first transmission signal, and bit string information in which whether or not error correction may be impossible is allocated to each application packet transmitted in the transmission unit in units of bits, and the address information in the first OAM packet includes first address information specifying the reception time information in the register, second address information specifying the total number information in the register, third address information specifying the identification information in the register, and fourth address information specifying the bit string information in the register.

7. The communication apparatus according to claim 1, wherein the second OAM packet includes the error correction impossible information read from the number-of-times storage unit on a basis of the address information.

8. The communication apparatus according to claim 1, wherein the second OAM packet includes the error correction impossible information.

9. The communication apparatus according to claim 8, wherein the second OAM packet includes a header and a payload, the payload of the second OAM packet includes the error correction impossible information, and the payload of the second OAM packet has a byte length corresponding to an amount of the error correction impossible information.

10. The communication apparatus according to claim 7, wherein the second OAM packet includes a header and a payload, and a length of the header of the second OAM packet is different between a case of including the error correction impossible information and a case of not including the error correction impossible information.

11. The communication apparatus according to claim 1, wherein the second OAM packet is transmitted to the communication partner apparatus as a response to the first OAM packet from the communication partner apparatus.

12. The communication apparatus according to claim 1, wherein the second OAM packet is transmitted to the communication partner apparatus each time it is determined that error correction of the at least one of the plurality of first packets may be impossible in the PHY.

13. The communication apparatus according to claim 1, wherein the plurality of first packets includes at least one of an I2C packet, an SPI packet, or a GPIO packet.

14. The communication apparatus according to claim 1, wherein information is alternately transmitted and received to and from the communication partner apparatus within a period allocated by a time division duplex (TDD) communication system.

15. A communication method including:

receiving, at a physical layer (PHY), a first transmission signal conforming to a predetermined communication protocol from a communication partner apparatus, and performing error correction on a plurality of first packets included in the first transmission signal;

separating, at a link layer (LINK), the plurality of first packets after error correction and generating a second packet including error correction impossible information of the first packet in which the error correction has not been correctly performed;

transmitting, by the PHY, a second transmission signal including the second packet to the communication partner apparatus, wherein the plurality of first packets includes at least one of an application packet or a first operation, administration, and maintenance (OAM) packet, the second packet includes a second OAM packet, the LINK includes an OAM unit that decodes the first OAM packet and generates the second OAM packet, the first OAM packet includes an error detection code, and the PHY detects an error in the first OAM packet on a basis of the error detection code and outputs an error detection signal; and storing a number of times of detection of an error of the first OAM packet by the OAM unit for each transmission unit of the first transmission signal, wherein the second OAM packet includes information of the stored number of times.

16. A non-transitory computer readable medium storing a program for communication, the program being executable by at least one processor to perform operations comprising:

receiving, at a physical layer (PHY), a first transmission signal conforming to a predetermined communication protocol from a communication partner apparatus, and performing error correction on a plurality of first packets included in the first transmission signal;

separating, at a link layer (LINK), the plurality of first packets after error correction and generating a second packet including error correction impossible information of the first packet in which the error correction has not been correctly performed;

transmitting, by the PHY, a second transmission signal including the second packet to the communication partner apparatus, wherein the plurality of first packets includes at least one of an application packet or a first operation, administration, and maintenance (OAM) packet, the second packet includes a second OAM packet, the LINK includes an OAM unit that decodes the first OAM packet and generates the second OAM packet, the first OAM packet includes an error detection code, and the PHY detects an error in the first OAM packet on a basis of the error detection code and outputs an error detection signal; and storing a number of times of detection of an error of the first OAM packet by the OAM unit for each transmission unit of the first transmission signal, wherein the second OAM packet includes information of the stored number of times.

* * * * *